(12) United States Patent
Mori et al.

(10) Patent No.: US 6,326,981 B1
(45) Date of Patent: *Dec. 4, 2001

(54) COLOR DISPLAY APPARATUS

(75) Inventors: Hideo Mori, Yokohama; Eisaku Tatsumi, Kawasaki; Kazuhiro Matsubayashi, Yokohama; Masanori Takahashi; Toshiyuki Kanda, both of Chigasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,433

(22) Filed: Aug. 28, 1998

(30) Foreign Application Priority Data

Aug. 28, 1997 (JP) .................................................. 9-233043
Jul. 13, 1998 (JP) ................................................. 10-197845

(51) Int. Cl.$^7$ ........................................................ G09G 5/02
(52) U.S. Cl. ............................................. 345/695; 345/694
(58) Field of Search ................................... 345/150, 151, 345/152, 613, 694, 695, 696

(56) References Cited

U.S. PATENT DOCUMENTS

| 4,812,017 | 3/1989 | Piper ........................................ 350/333 |
| 4,855,724 | * 8/1989 | Yang ........................................ 345/98 |
| 5,144,288 | * 9/1992 | Hamada et al. ....................... 345/152 |
| 5,317,437 | 5/1994 | Katakura ................................ 359/87 |
| 5,438,442 | 8/1995 | Katakura ................................ 359/54 |
| 5,465,157 | 11/1995 | Seto et al. ............................. 358/298 |
| 5,485,293 | 1/1996 | Robinder ................................ 359/59 |
| 5,654,732 | 8/1997 | Katakura ................................ 345/95 |
| 5,721,793 | 2/1998 | Ushida et al. ....................... 382/300 |
| 5,926,239 | * 7/1999 | Kumar et al. ......................... 349/69 |

FOREIGN PATENT DOCUMENTS 63 282717    11/1988   (JP) .

OTHER PUBLICATIONS

Patent Abstracts of Japan, vol. 013, No. 102 (P–841), Mar. 10, 1989.

* cited by examiner

*Primary Examiner*—Richard Hjerpe
*Assistant Examiner*—Duc Q. Dinh
(74) *Attorney, Agent, or Firm*—Fitzpatrick, Cella, Harper & Scinto

(57) ABSTRACT

A color display apparatus, such as a color liquid crystal display apparatus, is composed of a multiplicity of sub-pixels each designed for displaying one of a plurality (k) of mutually different mono-colors and arranged in rows and columns so as to form pixels each with a plurality of mutually adjacent sub-pixels. The sub-pixels and pixels are so arranged that a number n given by dividing a total number of sub-pixels arranged in a row or column with a total number of pixels arranged in the row or column is set to satisfy: 1<n<k, wherein k denotes the plurality of the mono-colors displayed by the sub-pixels. As a result, the pixel pitch can be reduced to provide an increased display density and an improved display quality.

19 Claims, 22 Drawing Sheets

| G | B | G | G | B | G | · · | 37 |
| R | B | R | R | B | R | · · | 17 |
| G | B | G | G | B | G | · · | 37 |
| R | B | R | R | B | R | · · | 17 |
| · | · | · | · | · | · | | |
| 35 | 10 | 35 | 35 | 10 | 35 | | |
| B | D | B | B | D | B | | |

$\begin{pmatrix} B = BRIGHT \\ D = DARK \end{pmatrix}$

FIG. 20A

| B | G | B | B | G | B | · · | 23 |
| R | G | R | R | G | R | · · | 30 |
| B | G | B | B | G | B | · · | 23 |
| R | G | R | R | G | R | · · | 30 |
| · | · | · | · | · | · | | |
| 15 | 50 | 15 | 15 | 50 | 15 | | |
| D | B | D | D | B | D | | |

FIG. 20B

| G | R | G | G | R | G | · · | 40 |
| B | R | B | B | R | B | · · | 13 |
| G | R | G | G | R | G | · · | 40 |
| B | R | B | B | R | B | · · | 13 |
| · | · | · | · | · | · | | |
| 30 | 20 | 30 | 30 | 20 | 30 | | |

COLOR DISPLAY APPARATUS

FIELD OF THE INVENTION AND RELATED ART

The present invention relates to a color display apparatus for effecting multi-color display by combination of ON/OFF of neighboring sub-pixels.

Hitherto, various color display apparatus have been used, inclusive of a liquid crystal device (liquid crystal panel) aligned with a color filter and light-emitting device (LED).

FIG. 1 is a sectional view of an example of conventional liquid crystal panel structure. Referring to FIG. 1, a liquid crystal panel P1 includes a pair of mutually oppositely disposed substrates 1a and 1b, which are applied to each other with a sealing member 2 to leave a gap that is filled with a liquid crystal 3.

A surface of one substrate 1a is provided with a multiplicity of stripe-shaped scanning electrodes 9a which are coated with an insulating film 10a and an alignment film 11a.

A surface of the other substrate 1b is provided with color filters or color filter segments 6 of three colors, i.e., R (red), G (green) and B (blue) arranged laterally, and these color filter segments 6 are coated with a protective film 7. On the surface of the protective film 7, a multiplicity of stripe-shaped data electrodes 9b are formed and are further coated with an insulating film 10b and an alignment film 11b.

For convenience of expression herein, characters R, G and B are frequently used, including "R-color", "G-color" and "B-color" representing respective colors; "R", "G" and "B" representing characterization of respective sub-pixels; and "6R", "6G" and "6B" representing color filters (or color filter segments) of respective colors.

The above-mentioned scanning electrodes 9a and data electrodes 9b are disposed so as to intersect each other to form a matrix electrode structure, and color filter segments 6R, 6G and 6B are respectively disposed one at each intersection of the electrodes so as to form sub-pixels R, G and B.

FIG. 2A is a schematic plan view for illustrating an arrangement of sub-pixels R, G and B, scanning electrodes 9a and data electrodes 9b. As is understood from FIG. 2A, three sub-pixels R, G and B are sequentially disposed along each scanning electrode 9a to form one pixel (as shown in FIG. 2B). The scanning electrodes 9a and data electrodes 9b are connected with respective drivers according to the TCP (tape carrier package) scheme or by bare chip loading so as to receive drive signals, whereby multi color display is effected by various combinations of ON/OFF of the sub-pixels R, G and B exhibiting respective colors.

FIGS. 2A and 2B show a pixel arrangement example wherein the sub-pixels R, G and B are respectively formed in a vertically elongated rectangular shape and form an almost square pixel in combination. However, it is also known to form a pixel arrangement wherein sub-pixels R, G and B are respectively formed in a square shape as shown in FIG. 11.

Known further pixel arrangements include one wherein four sub-pixels G, G, R and B are disposed as shown in FIG. 12, and one wherein four sub-pixels R, G, B and W (white) are disposed as shown in FIG. 13, which are inclusively called a quartet arrangement. The pixel arrangements shown in FIGS. 12 an 13 are good in vertical-lateral balance and can thus provide an apparently improved resolution. Further, the pixel arrangement shown in FIG. 13 can provide a display of an improved luminance because of a high transmittance at the sub-pixel W.

The display density of such a liquid crystal panel has generally been 80–100 dpi heretofore, but a higher resolution is desired in order to clearly display Japanese letters, particularly Chinese characters, and a minute graphic expression as used in CAD (computer-aided designing).

Some explanation will be made as to what a level of display density is desirable for a liquid crystal panel with reference to FIG. 3.

FIG. 3 is a graph showing a visual resolution (capability of recognizing a contour), i.e., a relationship between a response value and a resolution (display density) of a panel in the case of reproducing pictures, such as texts, figures and photographic images. The response value is a measure of dot-recognizability so that a higher response value represents a clearer recognizability of discrete dots in a picture and a lower response value represents a state where a picture is recognized as a continuous one. A solid line in FIG. 3 represents a relationship in the case of observation of a picture or image depicted on a reflection-type object in a distinct vision distance of 25 cm. The solid line shows that in the case of a reflective object, a display density of ca. 100 dpi provides a maximum response value so that individual dots can be recognized most clearly, and the response value remarkably lowers at a display density of 300 dpi or higher so that individual dots are hardly recognized. Thus, it is understood that a display density of 300 dpi or higher is required in order to provide a continuously recognizable image or picture. In view of these factors, a commercially available printer or digital copying machine is set to have a display density of 300–600 dpi, or 600–1000 dpi for a special use.

A similar relationship is found between a response value and a display density also in the case of a transmission-type object, such as a liquid crystal panel. However, as the distinct vision distance for a liquid crystal panel used as a monitor for a personal computer, a work station, etc. is ordinarily 30–50 cm, it is estimated that the characteristic curve is shifted from the solid line curve to a lower-resolution side as represented by a dashed line in FIG. 3.

In view of such a dashed line-characteristic curve, it is estimated that a display density on the order of 300 dpi is preferable for a liquid crystal panel, and a display density on the order of 600 dpi is preferable for a high-resolution type panel.

A higher display density of a liquid crystal panel can be realized by a smaller pixel pitch which in turn can be realized by a smaller electrode arrangement pitch. However, in view of the necessity of driver loading according to the TCP scheme or bare chip loading scheme, the electrode pitch has to be a certain value or larger, thus posing a limitation in increase of display density.

For example, in order to dispose driver ICs according to the TCP scheme, an electrode pitch of at least ca. 60 $\mu$m is required, so that 180 $\mu$m (i.e., three times the electrode pitch) is required as a minimum pixel pitch in the case of a pixel arrangement wherein three sub-pixels R, G and B are arranged in a row for one pixel as shown in FIG. 2 or FIG. 11. By calculation, the minimum pixel pitch provides ca. 140 dpi as an upper limit of display density. In the case of bare chip loading, an electrode pitch smaller than 60 $\mu$m is allowed, but still a certain limit is posed in providing an increased display density.

A quartet arrangement as shown in FIG. 12 or FIG. 13 allows a pixel pitch of ca. 120 $\mu$m which is smaller than that in the case of FIG. 2 but is still insufficient. Further, the arrangement shown in FIG. 12 or FIG. 13 uses a sub-pixel G or a sub-pixel W in addition to three sub-pixels of primary colors R, G and B, thus being accompanied with a difficulty of inferior color purity.

As another method of providing a higher display density, there is also known a so-called both-side loading scheme wherein driver ICs are disposed along a pair of mutually parallel edges of a liquid crystal panel. However, even by using this method, the display density can be increased to ca. two times at the most.

Now, if the number of pixels arranged in the direction of extension of a scanning electrode $9a$ is denoted by X and the number of pixels arranged in the direction of extension of a data electrode $9b$ is denoted by Y, the total number of data electrodes $9b$ is 3X and the total number of scanning electrodes $9a$ is Y, so that the driver ICs are required to have a number of channels which is equal to the total number $N_0$ ($N_0=3X+Y$) of the scanning electrodes $9a$ and the data electrodes $9b$. On the other hand, it is desired to reduce the total number $N_0$, in order to reduce the production cost and the product cost.

Incidentally, the total number $N_0$ of scanning electrodes and data electrodes in the above-mentioned conventional structure is (1) 800×3+600=3000 for a SVGA panel, (2) 1200×3+1024=4864 for an SXGA panel, and [(12×300)×3]+(9×300)=13500 for a liquid crystal panel having a diagonal size of 15 inches, a vertical/lateral size ratio of 4/3 (i.e., a vertical size of 12 inches and a lateral size of 9 inches) and a display density of 300 dpi.

SUMMARY OF THE INVENTION

An object of the present invention is to provide a color display apparatus capable of realizing a high display density.

Another object of the present invention is to provide a color display apparatus providing a good color quality and little color irregularity and yet capable of preventing an increase in product cost or production cost.

According to the present invention, in view of the above-mentioned circumstances, there is provided a color display apparatus comprising: a multiplicity of sub-pixels each designed for displaying one of a plurality (k) of mutually different mono-colors and arranged in rows and columns so as to form pixels each with a plurality of mutually adjacent sub-pixels, wherein the sub-pixels and pixels are so arranged that a number n given by dividing a total number of sub-pixels arranged in a row or column with a total number of pixels arranged in the row or column is set to satisfy: 1<n<k, wherein k denotes the plurality of the mono-colors displayed by the sub-pixels.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 5A–9A are schematic plan views each showing an arrangement of sub-pixels, scanning electrodes and data electrodes according to an embodiment of the invention; and FIGS. 5B–9B are schematic plan views each showing a relationship between sub-pixels and pixels corresponding to FIGS. 5A–9A, respectively.

FIGS. 20A–20C, FIGS. 21A–21C, FIGS. 22A–22C and FIGS. 23A and 23B are four sets of schematic plan views, each set illustrating an effect of an embodiment of the invention.

DESCRIPTION OF THE PREFERRED EMBODIMENTS

Figure 1:
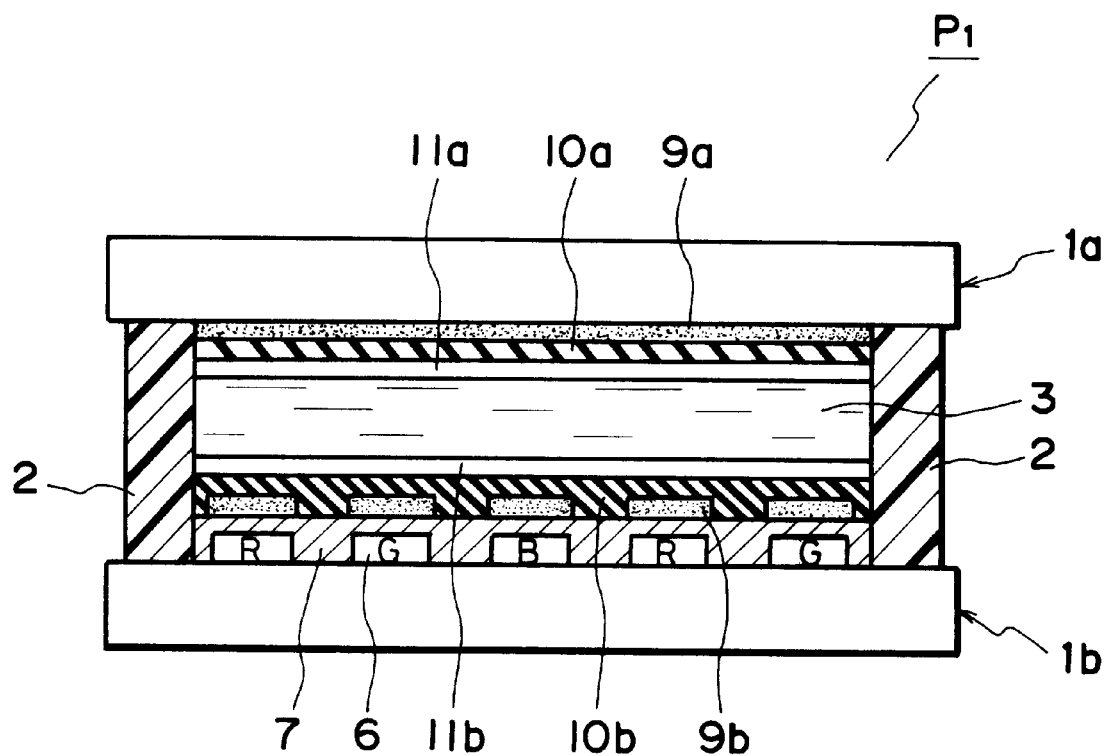
FIG. 1 is a sectional view showing an example structure of a conventional liquid crystal panel.
Figure 2A:
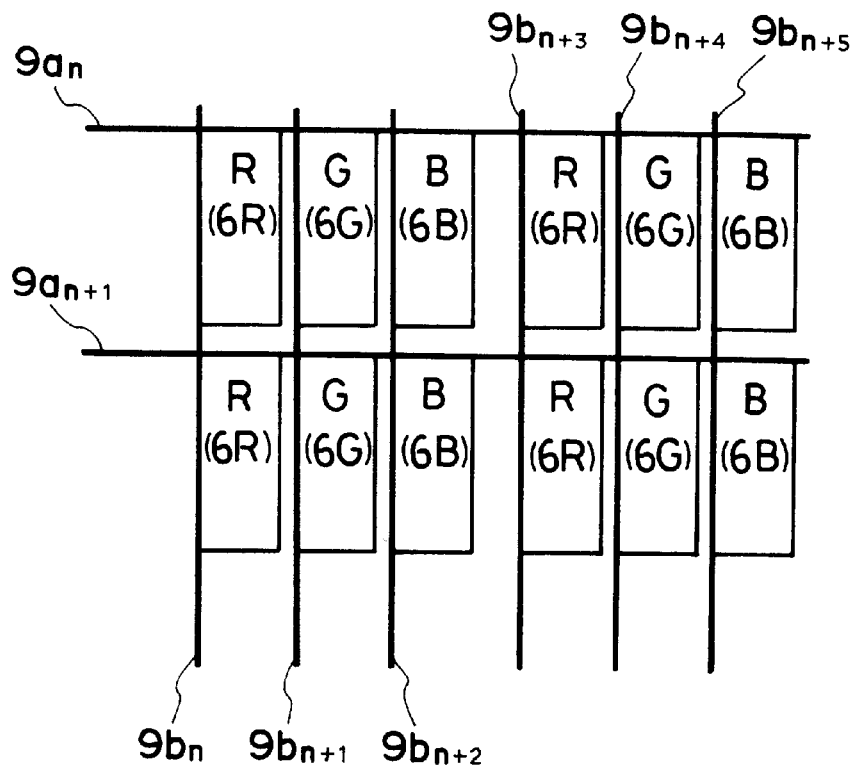
FIG. 2A is a schematic view showing an arrangement of sub-pixels, scanning electrodes and data electrodes.
Figure 2B:
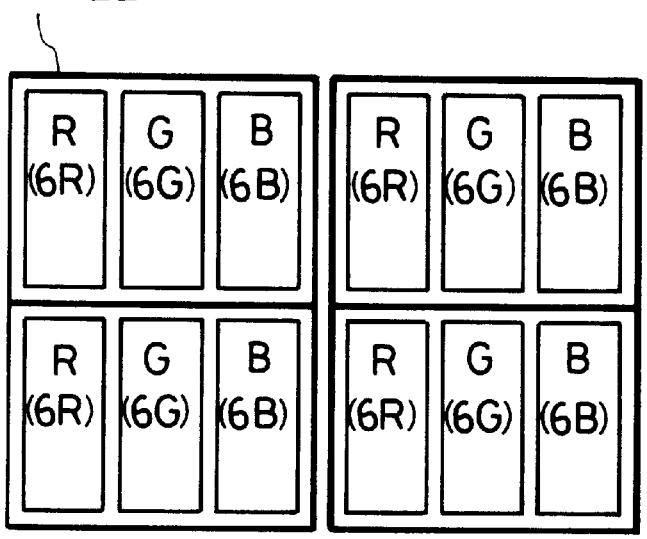
FIG. 2B is a schematic view showing a relationship between sub-pixels and pixels.
Figure 3:
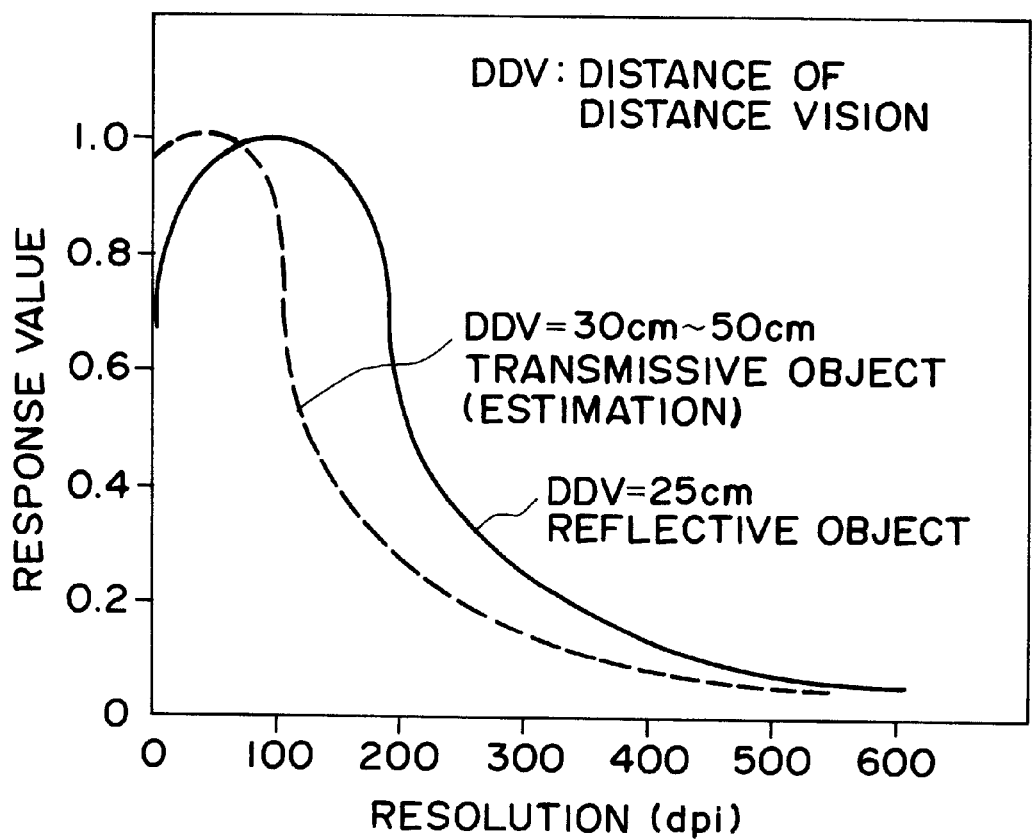
FIG. 3 is a graph showing a relationship between a visual response value (capability of recognizing contour) and a resolution (display density).

Some embodiments of the present invention will be described with reference to FIGS. 4–18 and FIG. 24 wherein identical parts are denoted by identical reference numerals or symbols and detailed description thereof will be omitted.

A color display apparatus P2 according to an embodiment of the present invention may comprise a multiple sets of sub-pixels R, G and B for displaying mutually different mono-colors, which are arranged in a plurality of vertical columns and a plurality of lateral or horizontal rows so as to form one pixel with a plurality (three in this embodiment) of neighboring sub-pixels adjacent to each other as a set, so as to effect a multi-color display by various combinations of ON/OFF of the neighboring sub-pixels. Further, the sub-pixels are so arranged that a quotient n obtained by dividing a total number of sub-pixels arranged in a column or row by a total number of pixels arranged in the column or row will satisfy a relationship of 1<n<k, wherein k denotes a number of colors of the sub-pixels.

Such a color display apparatus P2 may for example be constituted by a light-emitting color LED or a color liquid crystal panel.

Figure 4:
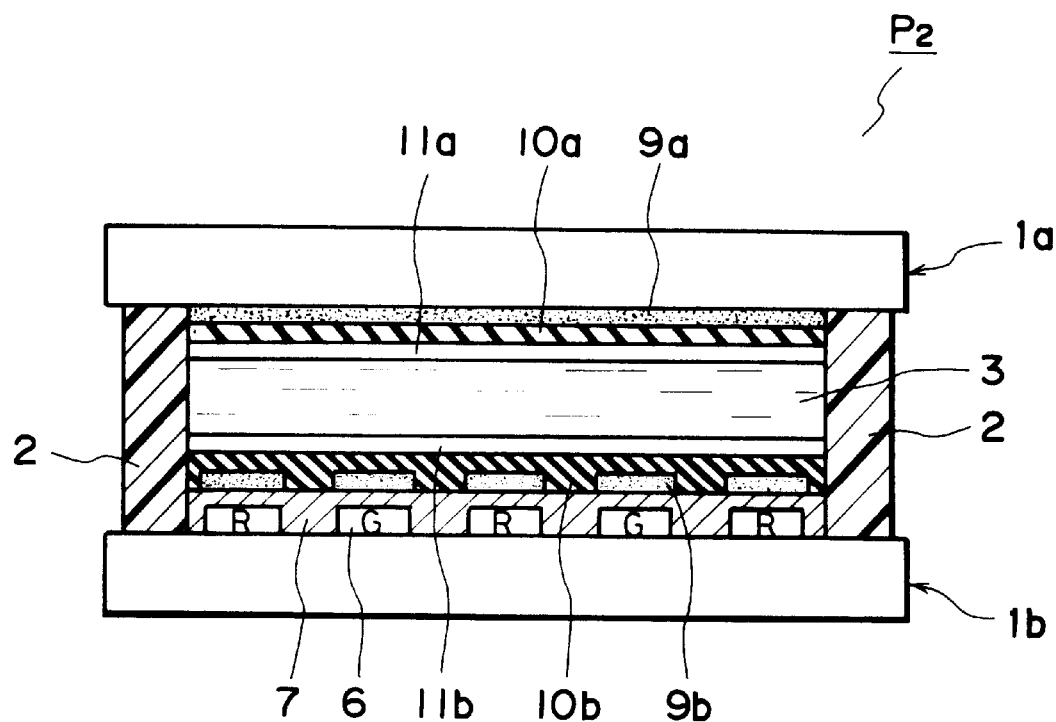
FIG. 4 is a sectional view of an embodiment of liquid crystal panel according to the invention.

For example, as shown in FIG. 4, a liquid crystal panel constituting the color display apparatus may comprise a pair of mutually oppositely disposed substrates $1a$ and $1b$, a liquid crystal 3 sandwiched between the substrates $1a$ and $1b$, a plurality of scanning electrodes $9a$ and a plurality of data electrodes $9b$ disposed on inner sides of the substrates $1a$ and $1b$ so as to intersect each other, and a plurality of color filter segments 6 each disposed at an intersection of the electrodes $9a$ and $9b$ so as to form one of the above-mentioned sub-pixels R, G and B. A prescribed number (three in this embodiment) of intersections (sub-pixels R, G and B) may form one pixel. Generally, the value of the above-mentioned number n may be given by dividing the total number of data electrodes 9b by a number (X as described later) of pixels arranged in a direction along a scanning electrodes 9a, and the above-mentioned number k may be the number of colors of the color filter segments 6.

In this embodiment, the scanning electrodes 9a and the data electrodes 9b are disposed on one and the other of the pair of substrates 1a and 1b, respectively, as shown in FIG. 4.

Figure 25:
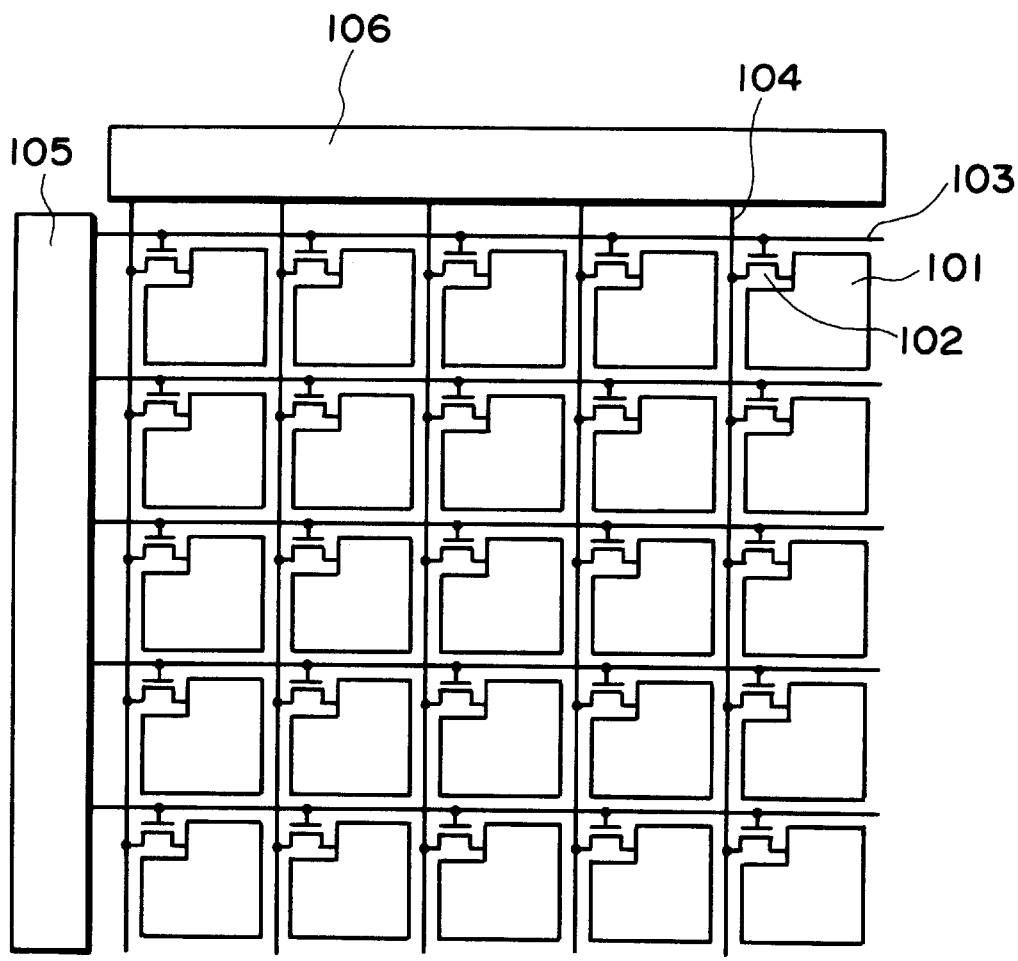
FIG. 25 is a schematic block plan view showing a planar arrangement in a color display apparatus according to the invention.
Figure 26:
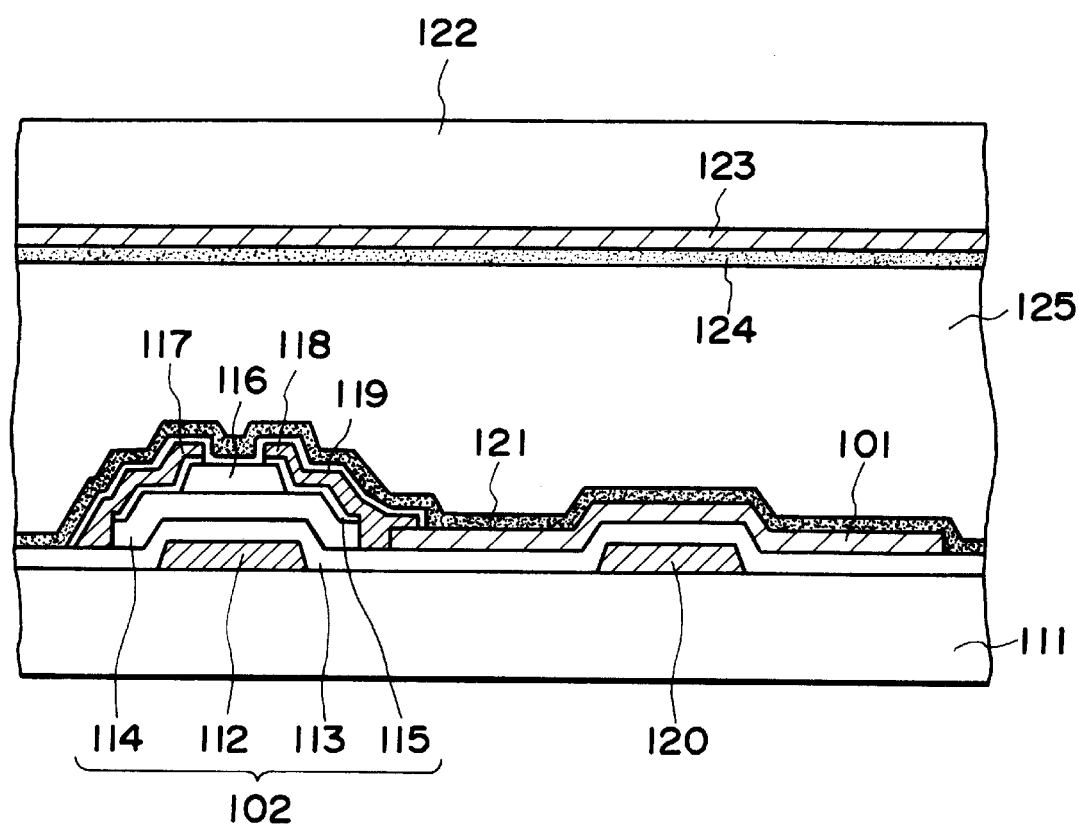
FIG. 26 is a schematic sectional view of an embodiment of the color display apparatus according to the invention.

However, the scanning electrodes (or scanning signal lines) and the data electrodes (or data signal lines) may also be disposed on one substrate. FIGS. 25 and 26 show an embodiment of such a device (panel) structure wherein scanning signal lines and data signal lines are formed on a single substrate.

More specifically, FIG. 25 is a schematic plan diagram showing another embodiment of color display apparatus according to the present invention. Referring to FIG. 25, the color display apparatus includes a matrix of pixel electrodes 101, TFTs (thin film transistors) 102, scanning signal lines 103, data signal lines 104, a scanning signal application circuit 105 and a data signal application circuit. This preferred embodiment of the present invention is an active matrix-type apparatus having an active element (or device) at each pixel. In this embodiment, as shown in FIG. 25, a plurality of the pixel electrodes 101 are disposed in a matrix arrangement. Each pixel electrode 101 is provided with a TFT 102, of which a gate electrode is connected to a scanning signal line 103 and a source electrode is connected to a data signal line 104. A plurality of the scanning signal lines 103 and a plurality of the data signal lines 104 are arranged in a matrix form. The scanning signal lines 103 are sequentially supplied with a scanning selection signal (ON signal for TFT 102) from a scanning signal application circuit 105, and in synchronism with the scanning selection signal, data signals having prescribed gradation data are supplied to the pixel electrodes 101 on selected data scanning lines 104 to apply a prescribed voltage to an optical modulation layer of, e.g., a liquid crystal, thereby effecting a display at respective pixels.

FIG. 26 is a schematic sectional view showing a structure of one pixel of a TFT device as included in the display apparatus shown in FIG. 25, each pixel of a TFT device is constituted by a substrate 111 having thereon a gate electrode 112, a gate insulating film 113, a semiconductor layer 114, an ohmic content layer 115, an insulating layer 116, a source electrode 117, a drain electrode 118, a passivation film 119, a retention capacitance electrode 120 and an alignment film 121; another substrate 122 having thereon a common electrode 123 and an alignment film 124; and a liquid crystal 125 disposed between the substrates 111 and 122.

In the liquid crystal device of FIG. 26, the substrate 111 may ordinarily comprise a transparent substrate, such as that of glass or plastic, in the case of a transmission type, and can comprise an opaque substrate, such as a silicon substrate, in the case of a reflection type. The pixel electrode 101 and the common electrode 123 both comprise a transparent conductor, such as ITO, in the case of a transmission type, but the pixel electrode 101 can be composed of a metal having a high reflection plate, in the case of a reflection type. The semiconductor layer 114 may generally comprise amorphous (a-)Si but may also preferably comprise polycrystalline (p-)Si. The ohmic contact layer 115 may for example comprise an $n^+$ a-Si layer. The gate insulating film 113 may for example comprise silicon nitride ($SiN_x$). The gate electrode 112, the source electrode 117, the drain electrode 118, the retention capacitance electrode 120 and conductors may generally comprise a metal, such as Al (aluminum). The retention capacitance electrode 120 can comprise a transparent conductor, such as ITO (indium tin oxide) in some cases, where it is formed in a wide area. The insulating layer 116 and the passivation film 119 may preferably comprise an insulating film of silicon nitride, etc. The alignment films 121 and 124 may comprise a material which may be selected depending on the liquid crystal and/or the mode of drive thereof, e.g., a rubbed film of a polymer, such as polyimide or polyamide, e.g., in the case of homogeneous alignment of a smectic liquid crystal.

As for the liquid crystal, it is possible to suitably use a smectic liquid crystal having a spontaneous polarization, e.g., an anti-ferroelectric liquid crystal having no threshold (TAFLC) to effect a good gradational display. More specifically, TAFLC is an anti-ferroelectric liquid crystal exhibiting a transmittance which varies continuously in response to a change of applied voltage, thus not having a clear threshold. Accordingly, by controlling the voltage applied to the liquid crystal, the transmittance can be varied continuously.

In addition to the above, it is also possible to use a nematic liquid crystal in the OCB (Optically Compensated Bend) mode, wherein liquid crystal molecules are disposed to have a pretilt angle with respect to the substrate boundaries and aligned in parallel with a normal to the substrates at a mid point along the normal between the substrates, thus exhibiting a bent alignment state. For providing a liquid crystal device according to the OCB mode, the pair of substrates are provided with homogeneous alignment films so that their rubbing directions are parallel or substantially parallel to each other whereby the liquid crystal molecules are aligned to assume a splay alignment wherein the liquid crystal molecules are aligned to assume a pretilt angle with respect to the substrate boundaries and aligned in parallel with the rubbing direction (or in a direction which is an average rubbing direction in case where the rubbing directions for the substrates intersect each other). When a prescribed bending voltage is applied to the liquid crystal layer in this alignment state, liquid crystal molecules are realigned to be parallel to the substrate normal at a mid position of the liquid crystal layer along the substrate normal and gradually approach the pretilt angle at positions closer to the substrate boundaries, thus forming a bend alignment state. The bend alignment state can be retained at a holding voltage that is lower than the above-mentioned bending voltage, and if a prescribed voltage higher than the holding voltage is applied to the liquid layer, the liquid crystal molecules are re-aligned to be parallel to the substrate normal in a major portion except for the vicinity of the substrate boundaries. The response speed for the change between the alignment state and the bend alignment state is fast, and also intermediate states can be allowed, so that a gradational display can be effected by changing the applied voltage while setting the holding voltage to a lower voltage side.

In the present invention, it is also possible to use a liquid crystal according to the conventional TN mode, an anti-ferroelectric liquid crystal showing three stable states, a DHF (Deformed Helix Ferroelectric) liquid crystal, as desired, in addition to the above-mentioned OCB mode.

In the above-described embodiment, TFTs are used as active devices, but two-terminal devices, such as MIMs may also be used.

In a preferred embodiment, the number (k) of sub-pixel colors may be set to 3 of R, G and B, so that the above-defined number n satisfies 1<n<3.

In this case, the color filter 6 may be composed of color filter segments of three colors of R, G and B.

More specifically, sub-pixels R, G and B may be arranged as shown in any one of FIGS. 5–9.

Figure 5A:
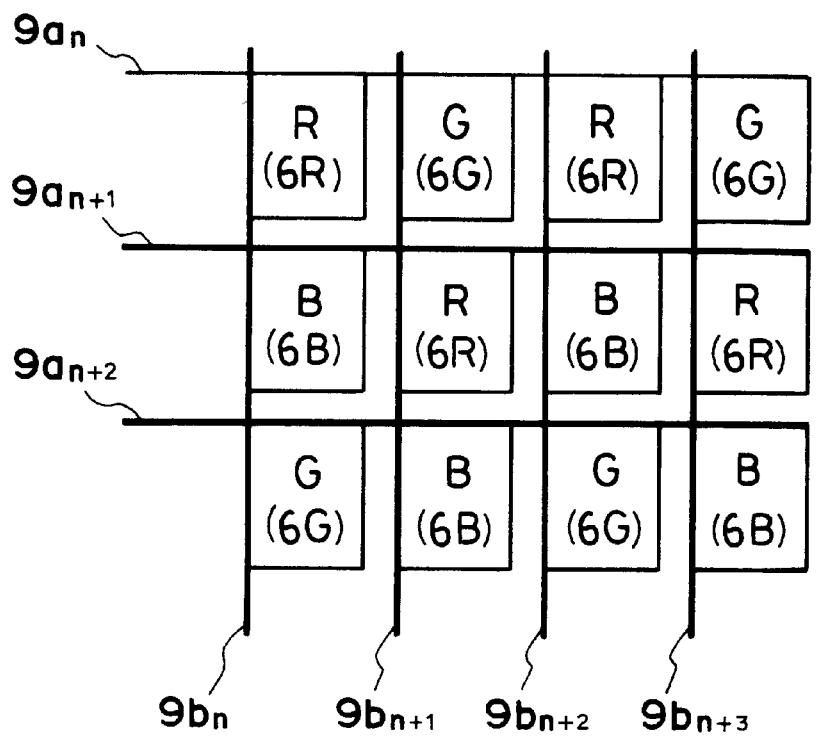
Figure 5B:
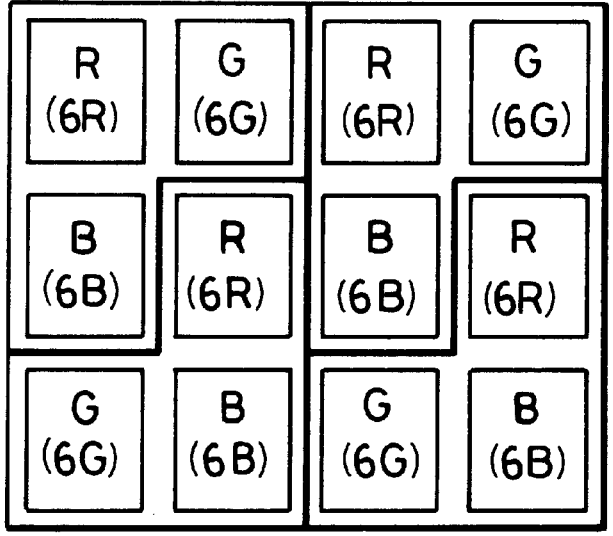

FIGS. 5A and 5B show an embodiment of n=2, wherein for adjacent 3 scanning electrodes (a first canning electrode $9a_n$, a second scanning electrode $9a_{n+1}$ and a third scanning electrode $9a_{n+2}$), first and second color filter segments 6R and 6G are alternately disposed along the first scanning electrode $9a_n$, third and first color filter segments 6B and 6R are alternately disposed along the second scanning electrode $9a_{n+1}$, and second nd third color filter segments 6G and 6B are alternately disposed along the third scanning electrode $9a_{n+1}$. Further, one pixel is composed of first and second color filter segments 6R and 6G along the first scanning electrode $9a_n$ and a third color filter segment 6B along the second scanning electrode $9a_{n+1}$, and another one pixel is composed of a first color filter segment 6R along the second scanning electrode $9a_{n+1}$ and second and third color filter segments 6G and 6B along the third scanning electrode $9a_{n+2}$.

Figure 6A:
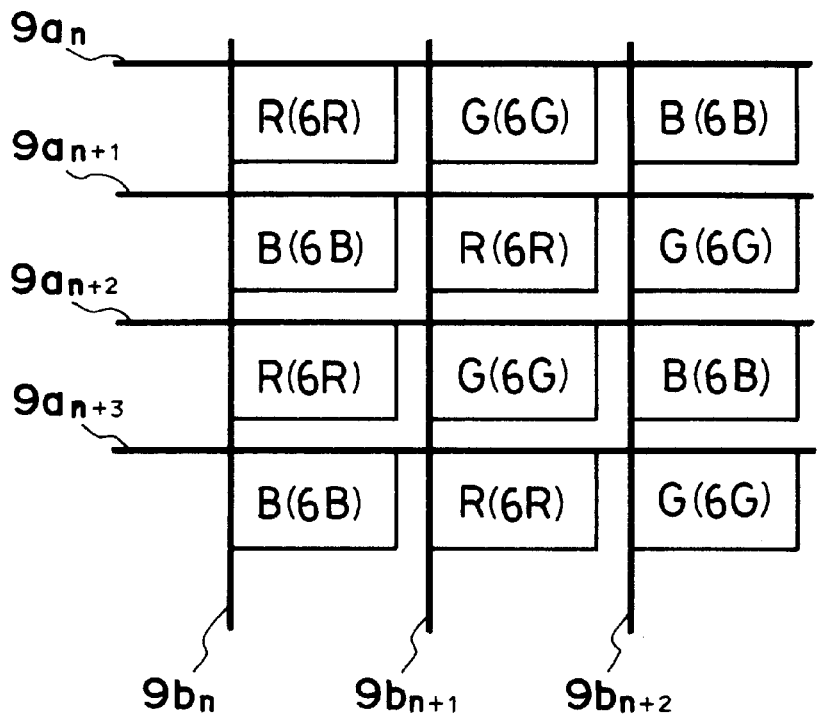
Figure 6B:
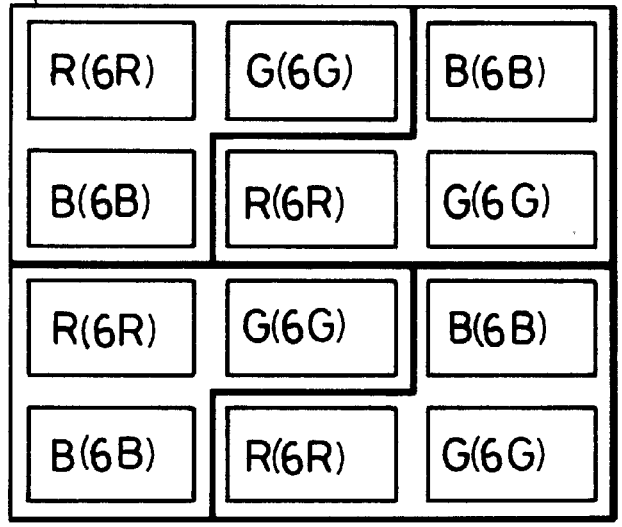

FIGS. 6A and 6B show an embodiment of n=3/2, wherein for adjacent 2 scanning electrodes (a first scanning electrode $9a_n$ and a second scanning electrode $9a_{n+1}$), first to third color filter segments 6R, 6G and 6B are disposed sequentially along the first scanning electrode $9a_n$, and third, first and second color filter segments 6B, 6R and 6G are disposed in this order along the second scanning electrode $9a_{n+1}$, a third color filter segment 6B along the second scanning electrode $9a_{n+1}$ is made adjacent to one of first and second color filter segments 6R and 6G along the first scanning electrode $9a_n$ so that these three color filter segment are caused to constitute one pixel; and a third color filter segment 6B along the first scanning electrode $9a_n$ and first and second color filter segments 6R and 6G are caused to constitute another one pixel.

Figure 7A:
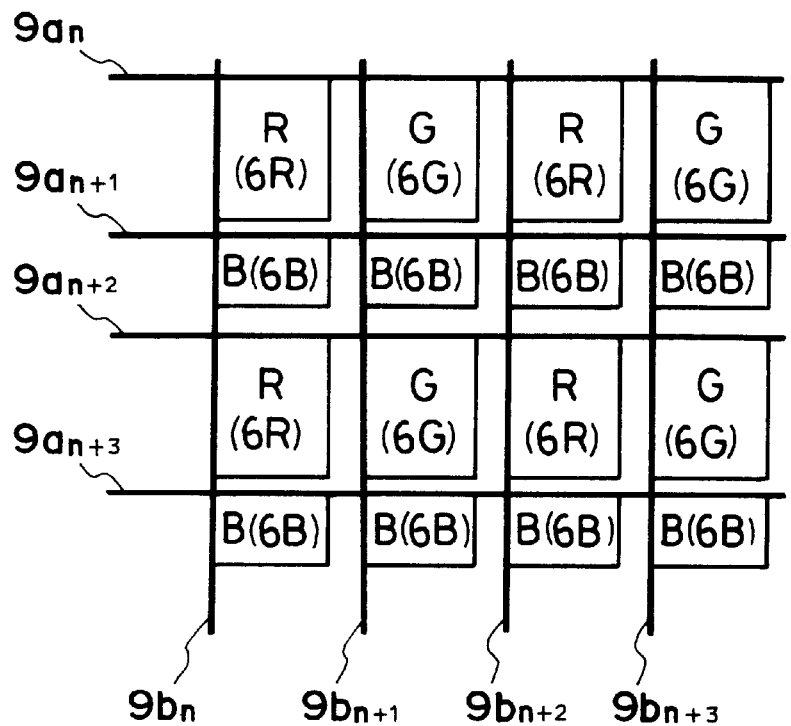
Figure 7B:
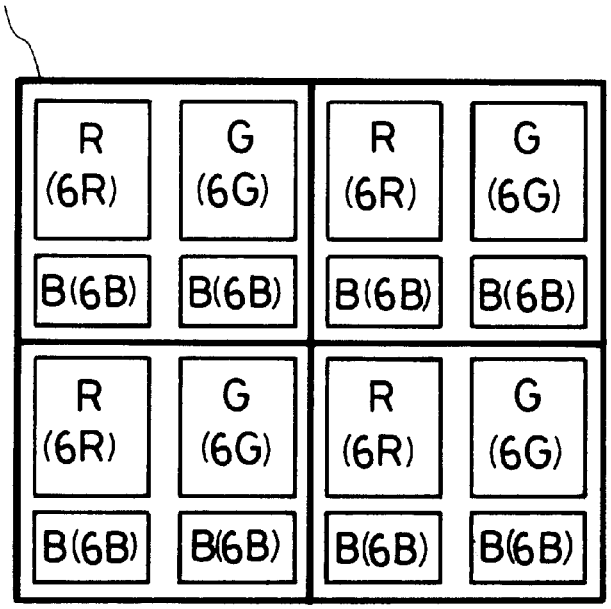

Further, FIGS. 7A and 7B show an embodiment of n=2, wherein for adjacent 2 scanning electrodes (a first scanning electrode $9a_n$ and a second scanning electrode $9a_{n+1}$), first and second color filter segment 6R and 6G are alternately disposed along the first scanning electrode $9a_n$, and third color filter segments 6B are disposed in succession along the second scanning electrode $9a_{n+1}$, so that one pixel is composed of a pair of first and second color filter segments 6R and 6G and two third color filter segments 6B.

Figure 8A:
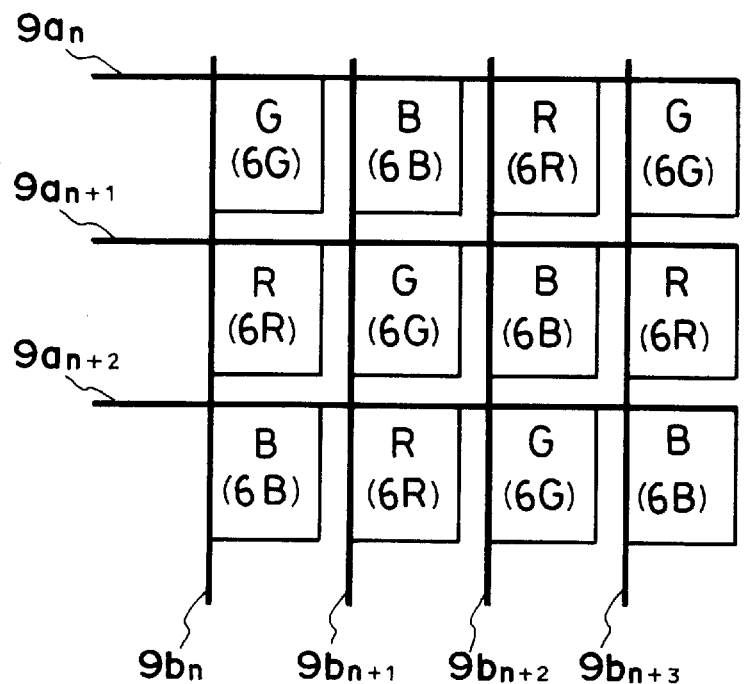
Figure 8B:
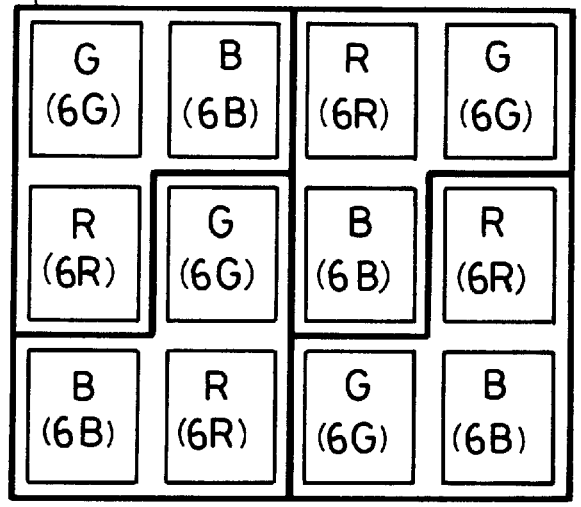

Further, FIGS. 8A and 8B show an embodiment of n=2, wherein for adjacent 3 scanning electrodes (a first scanning electrode $9a_n$, a second scanning electrode $9a_{n+1}$ and a third scanning electrode $9a_{n+2}$), first to third color filter segments 6G, 6B and 6R are disposed in this order along each of the respective scanning electrodes $9a_n$, $9a_{n+1}$ and $9a_{n+2}$, and in the order of the first color filter segment 6G, the third color filter segment 6R and the second color filter segment 6B, along each of the data electrodes $9b_n$, $9b_{n+1}$ and $9b_{n+2}$, so that color filter segments of each color are arranged in an oblique direction, and one pixel is composed of each of the following sets:

first and second color filter segments 6G and 6B disposed along the first scanning electrode $9a_n$, and a third color filter segment 6R disposed along the second scanning electrode $9a_{n+1}$;

third and first color filter segment 6R and 6G disposed along the first scanning electrode $9a_n$, and a second color filter segment 6B disposed along the second scanning electrode $9a_{n+1}$;

a first color filter segment 6G disposed along the-second scanning electrode $9a_{n+1}$, and second and third color filter segments disposed along the third scanning electrode $9a_{n+2}$; and a third color filter segment 6R disposed along the second scanning electrode $9a_{n+1}$, and first and second color filter segments 6G and 6B disposed along the third scanning electrode $9a_{n+2}$.

Figure 9A:
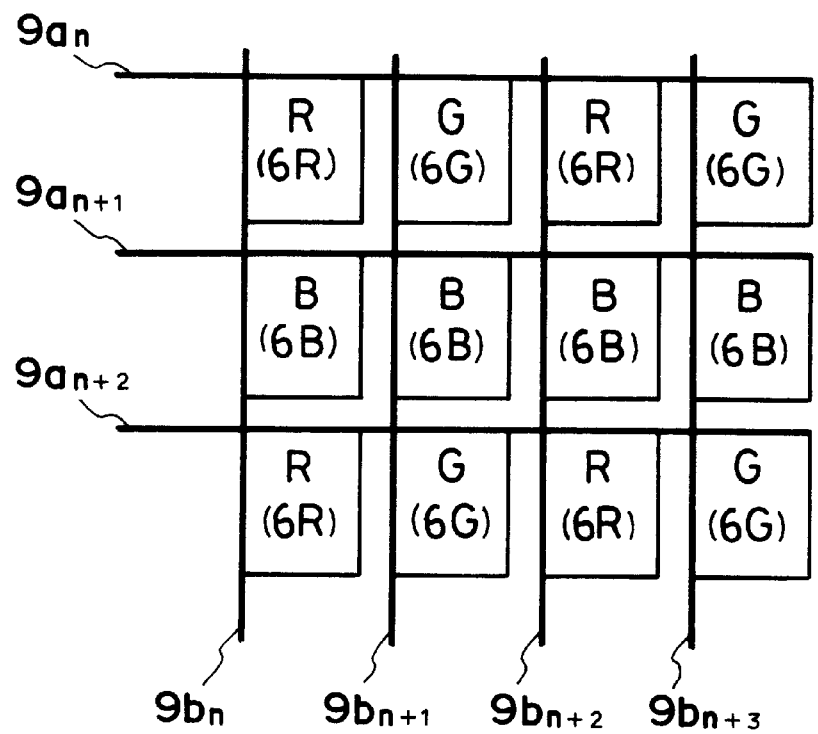
Figure 9B:
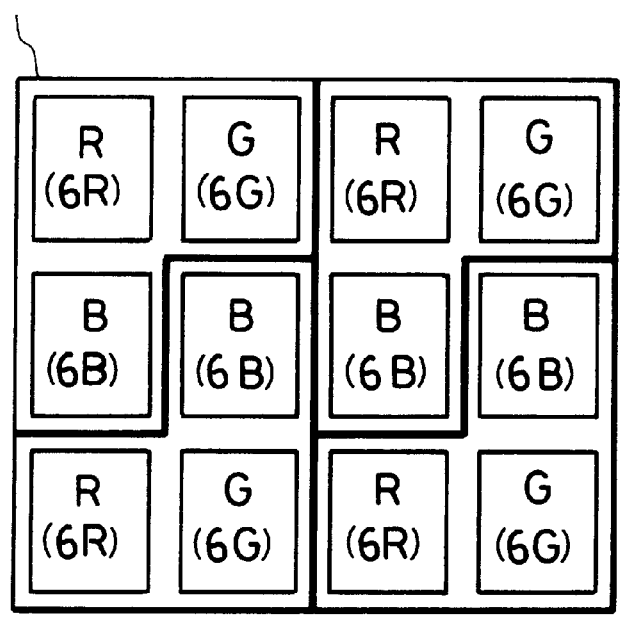

Further, FIGS. 9A and 9B show an embodiment of n=2, wherein for adjacent 3 scanning electrodes (a first scanning electrode $9a_n$, a second scanning electrode $9a_{n+1}$, and a third scanning electrode $9a_{n+2}$), first and second color filter segments 6R and 6G are alternately disposed along the first scanning electrode $9a_n$, third color filters 6B are arranged in succession along the second scanning electrode $9a_{n+1}$, and first and second color filter segments 6R an 6G are again alternately disposed along the third scanning electrode $9a_{n+1}$, so that one pixel is constituted by each of a set of first and second color filter segments 6R and 6G disposed along the first scanning electrode $9a_n$, and a third color filter segment 6B disposed along the second scanning electrode $9a_{n+1}$, and a set of a third color filter segment 6B, and first and second color filter segments 6R and 6G disposed along the third scanning electrode $9a_{n+2}$.

In each of the above-mentioned embodiments, it is preferred that the number X of pixels disposed along a scanning electrode 9a, and the number Y of pixels disposed along a data electrode 9b, satisfy the relationship of: Y/X<n<3.

Further, the number n may be set to close to a value of $(3Y/X)^{1/12}$.

It is also preferred to use a liquid crystal showing ferro-electricity as the liquid crystal 3.

On the other hand, it is also possible to adopt sub-pixel arrangements as shown in FIGS. 14 to 16 and FIG. 24, wherein sub-pixels are arranged in three columns as a unit; a first column is composed of first-color and second-color sub-pixels disposed alternately; a second column is composed of third-color sub-pixels; and a third column is composed first-color and second-color sub-pixels disposed alternately; so that one pixel is composed by a set of first-color and second-color sub-pixels in the first column and a third-color sub-pixel in the second column, and also by a set of a third color sub-pixel in the second column and first-color and second-color sub-pixels in the third column.

Figure 14:
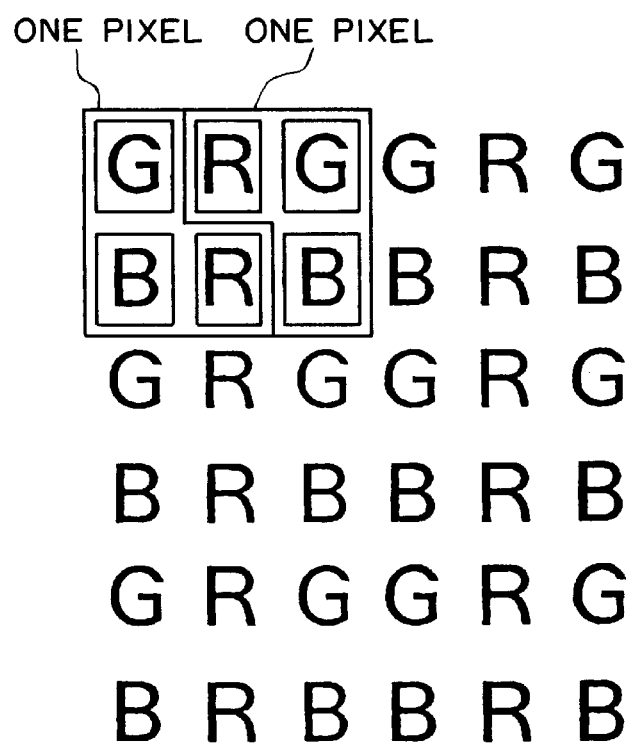
FIGS. 14–18 are schematic plan views each showing another pixel arrangement according to the invention.
Figure 15:
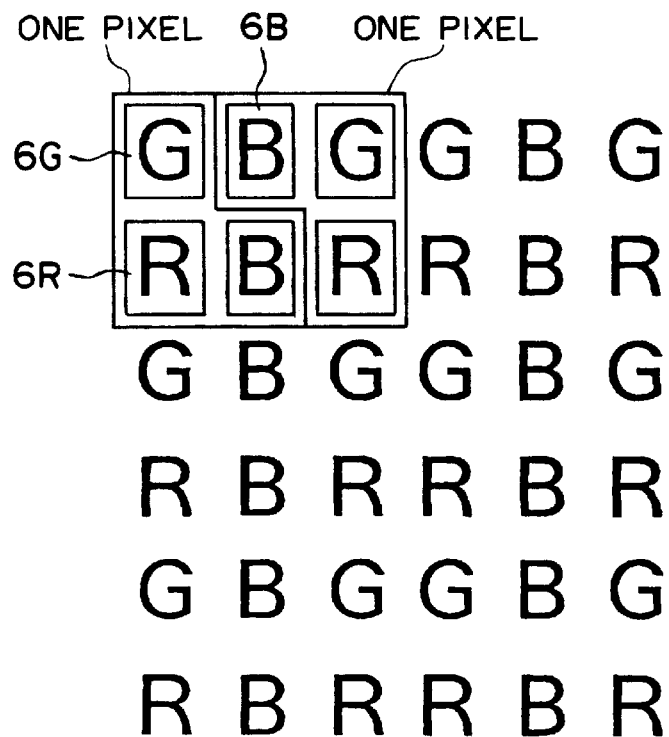
Figure 16:
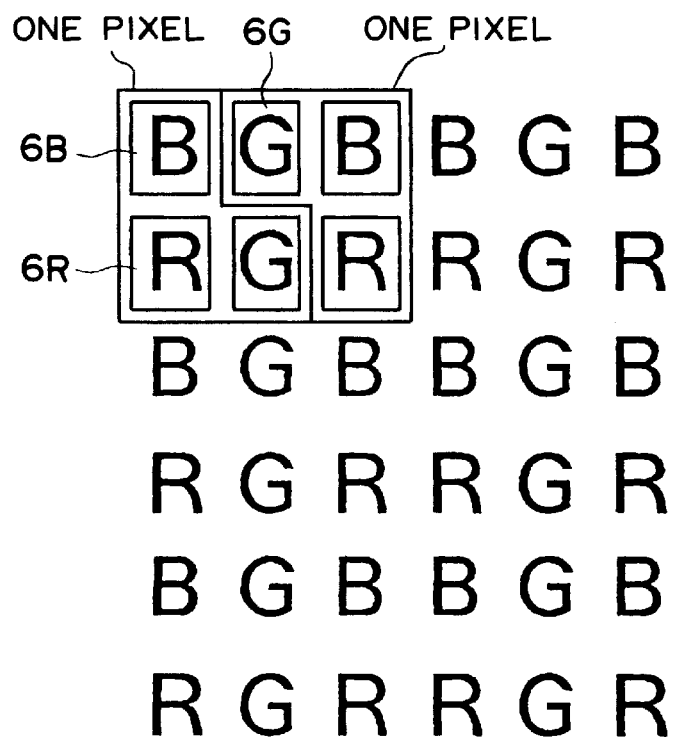
Figure 24:
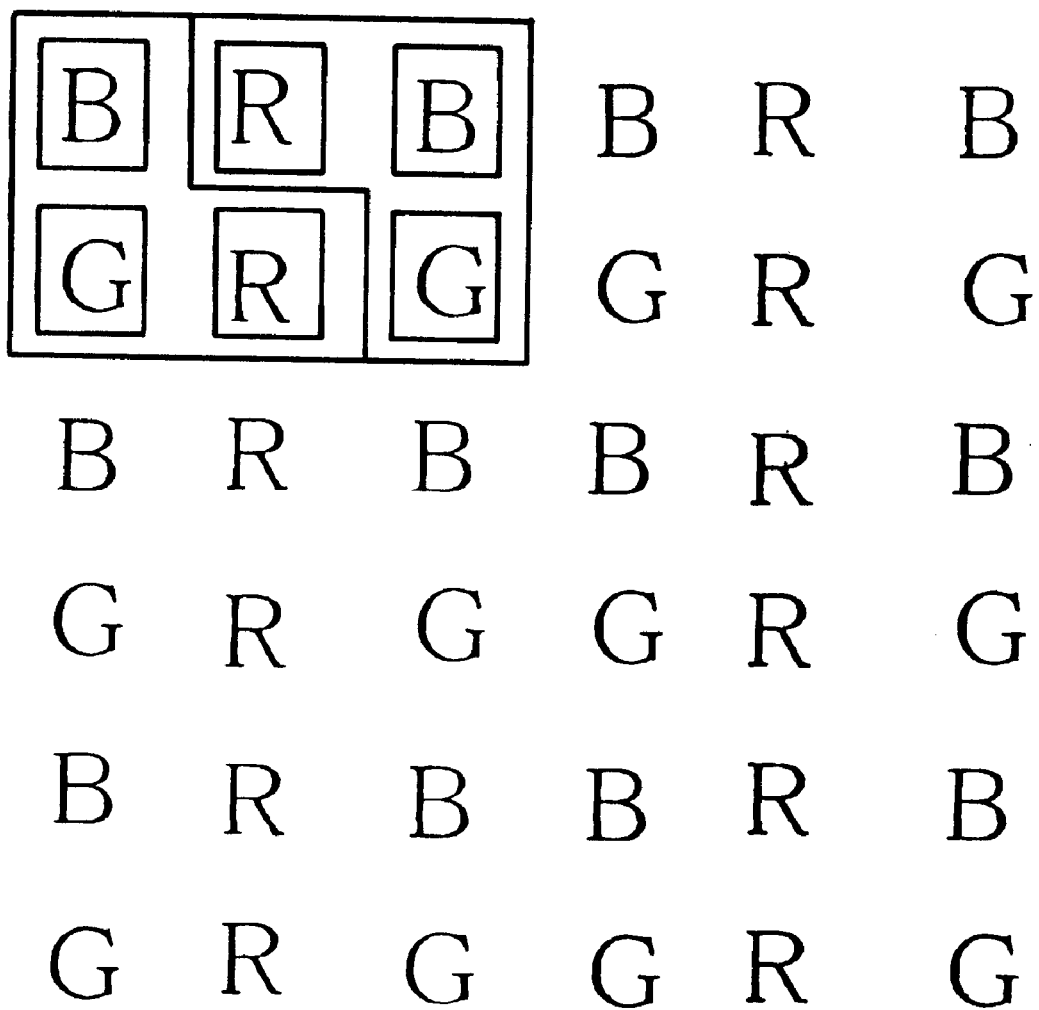
FIG. 24 is a schematic plan view showing still another pixel arrangement according to the invention.

FIG. 14 shows an embodiment wherein the first color is green (G), the second color is blue (B) and the third color is red (R); FIG. 15 shows an embodiment wherein the first color is G, the second color is R and the third color is B; FIG. 16 shows an embodiment wherein the first color is B, the second color is R and the third color is G; and FIG. 24 shows an embodiment wherein the first color is B, the second color is G and the third color is R.

Figure 17:
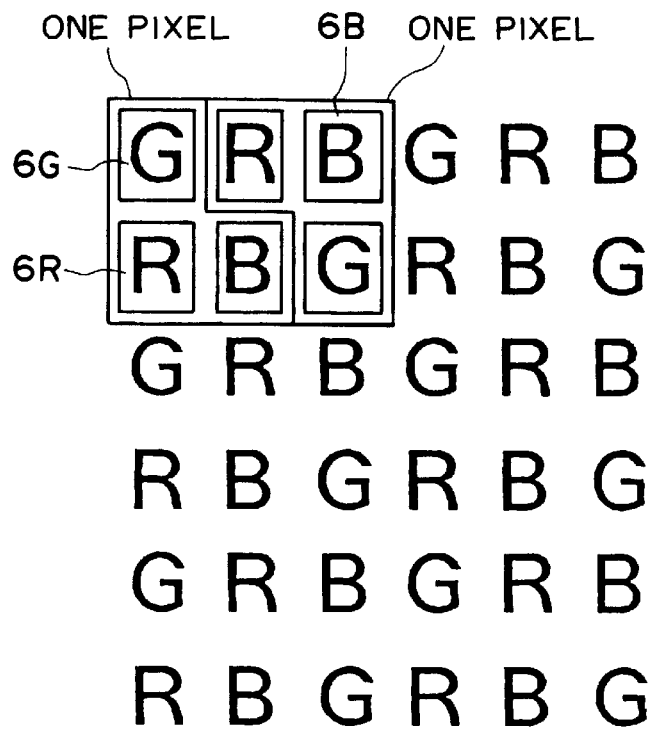

On the other hand, FIG. 17 shows an embodiment including three adjacent columns as a unit, wherein a first column is composed of first-color and second-color sub-pixels disposed alternately; a second column is composed of second-color and third-color sub-pixels disposed alternately; and a third column is composed of third-color and first-color sub-pixels disposed alternately; so that one pixel is composed of first-color and second-color sub-pixels in the first column and a third-color sub-pixel in the second column, and another one pixel is composed of a second-color sub-pixel in the second column and third-color and first-color sub-pixels in the third column. In FIG. 17, the first color is green (G), the second color is red (R) and the third color is blue (B).

Figure 18:
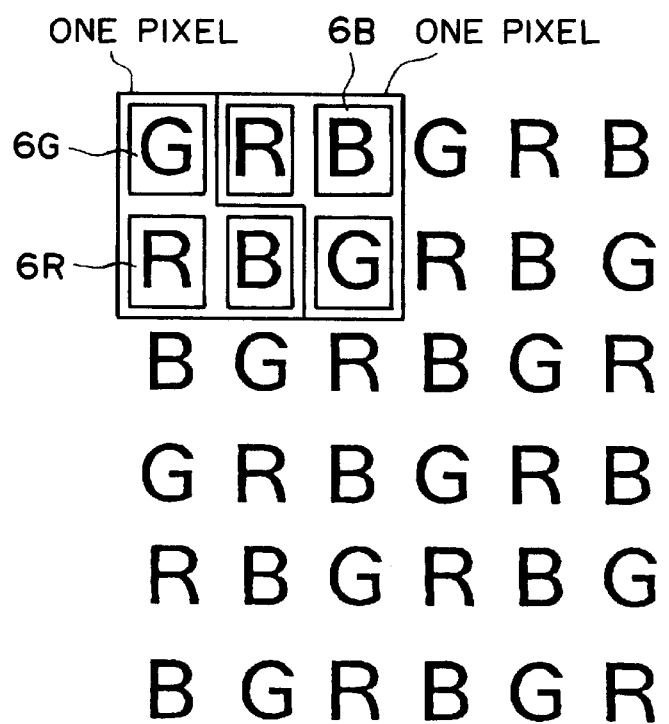

FIG. 18 shows an embodiment including adjacent three columns as a unit, wherein a first column is composed of first-color to third-color sub-pixels disposed in third order, a second column is composed of first-color to third-color sub-pixels disposed in this order while the first-color sub-pixel therein is disposed adjacent to the third-color sub-pixel in the first column, and a third column is composed of first-color to third-color sub-pixels disposed again in this order while the first-color sub-pixel therein is disposed adjacent to the third-color sub-pixel in the second column; so that one pixel is composed of (2i−1)th and (2i)th sub-pixels in the first column and a (2i)th sub-pixel in the second column, and another one pixel is composed of a (2i−1)th sub-pixel in the second column and (2i−1)th and (2i)th sub-pixel in the third column. In FIG. 18, the first color is G, the second color is R and the third color is B.

In the above-described embodiments, it is preferred that the first-color to third-color sub-pixels, R, G and B are formed in substantially equal shapes and areas and disposed in substantially equal spacings.

Herein, the substantially equal shapes mean that the largest vertical/lateral ratio for the three-color sub-pixels do not differ by more than 10%. Similarly, the substantially equal areas mean, that the largest area and the smallest area, respectively for the three-color sub-pixels, do not differ by more than 10%. Further, the equal spacings mean that the three-color sub-pixels are arranged vertically and laterally with equal spacings, and the substantially equal spacings mean that a deviation in these spacings does not exceed 10%, preferably 5%.

It is also preferred that three-color sub-pixels forming one pixel are arranged so that their centers (each at an intersection of two diagonal lines in case of a rectangular sub-pixel) form a triangle of which the largest side and the smallest side provide a ratio therebetween of at most 1.5. For example, in the embodiment of FIG. 14, three sub-pixels G, B and R forming one pixel at the upper-left corner are so arranged that their enters form a substantially isoscales right-angled triangle of which the largest side (formed by connecting the centers of sub-pixels G and R) and the smallest side (formed by connecting the centers of sub-pixels B and R) provide a ratio therebetween of nearly √2=ca. 1.41≦1.5.

The effects of the above-described embodiments are as follows.

In the above-described embodiments, with respect to the number k of colors of sub-pixels or color filter segments, the number n obtained by dividing the total number of sub-pixels arranged in a row or column with the number of pixels arranged in the row or column, is set to satisfy 1<n <k, preferably 1<n<3 for k=3, whereby the minimum pixel pitch can be decreased compared with the conventional value, and accordingly the upper limit of e-the display density can be increased. For example, in the case of using a driver IC of the TCP-type, the minimum electrode pitch is generally on the order of ca. 60 μm as mentioned above, the minimum pitch becomes ca. 120 μm, i.e., twice the electrode pitch, in the case of n=2, which corresponds to the upper limit display density of ca. 21 dpi, which is a higher display density than the conventional level. For similar reason, a higher display density becomes possible also in the case of bare chip loading.

If the number n is set to be smaller along a scanning electrode $9a$, the pixel-pitch along a scanning electrode becomes smaller but the pixel pitch along a data electrode reversely becomes larger. Accordingly, in order to realize a practically higher display density, the number n has to be determined in view of harmonization of both pixel pitches.

Hereinbelow, a manner of determining n giving a maximum display density in case of k=3 will be described.

If the number n is given by driving the total number of data electrodes $9b$ with the number (X) of pixels arranged in a direction along a scanning electrode $9a$, a number given by dividing the total number of scanning electrodes $9a$ with number (Y) of pixels disposed along a data electrode $9b$ becomes 3/n. Accordingly, if the minimum spacing for disposing a driver IC is denoted by "S" (=ca. 60 μm in case of using driver ICs according to the TCP scheme), one pixel pitch (disposed along a scanning electrode $9a$) becomes n×S, and the other pixel pitch (disposed along a data electrode $9b$ becomes (3/n)×S. Accordingly, the upper limit display density along a scanning electrode $9a$ becomes $25.4 \times 10^3/nS$, and the upper limit display density along a data electrode $9b$ becomes $25.4 \times 10^3/[(3/n)S]$. As the practically highest display densities is given when these upper limit display density are equal to each other, the condition is reduced to n=3/n, thus n=ca. 1.7.

Incidentally, if the number of electrodes (scanning electrodes or gate electrodes) is increased in order to minimize the difference between the pixel pitch along a scanning electrode $9a$ and the pixel pitch along a data electrode $9b$ as described above, the picture quality is liable to be inferior in the case of an STN-type liquid crystal device, or it is necessary to lower the resistivity of a gate electrode in the case of a TFT-type liquid crystal device, but a liquid crystal device using a ferroelectric liquid crystal having bistability is free from such difficulties.

On the other hand, in case where the number n is set to satisfy (Y/X)<n<3, the total number of scanning electrodes and data electrodes can be reduced than the conventional value, and the total number of driver IC channels can be reduced correspondingly, thus reducing the product cost and the production cost. This is explained with reference to FIG. 10.

Figure 10:
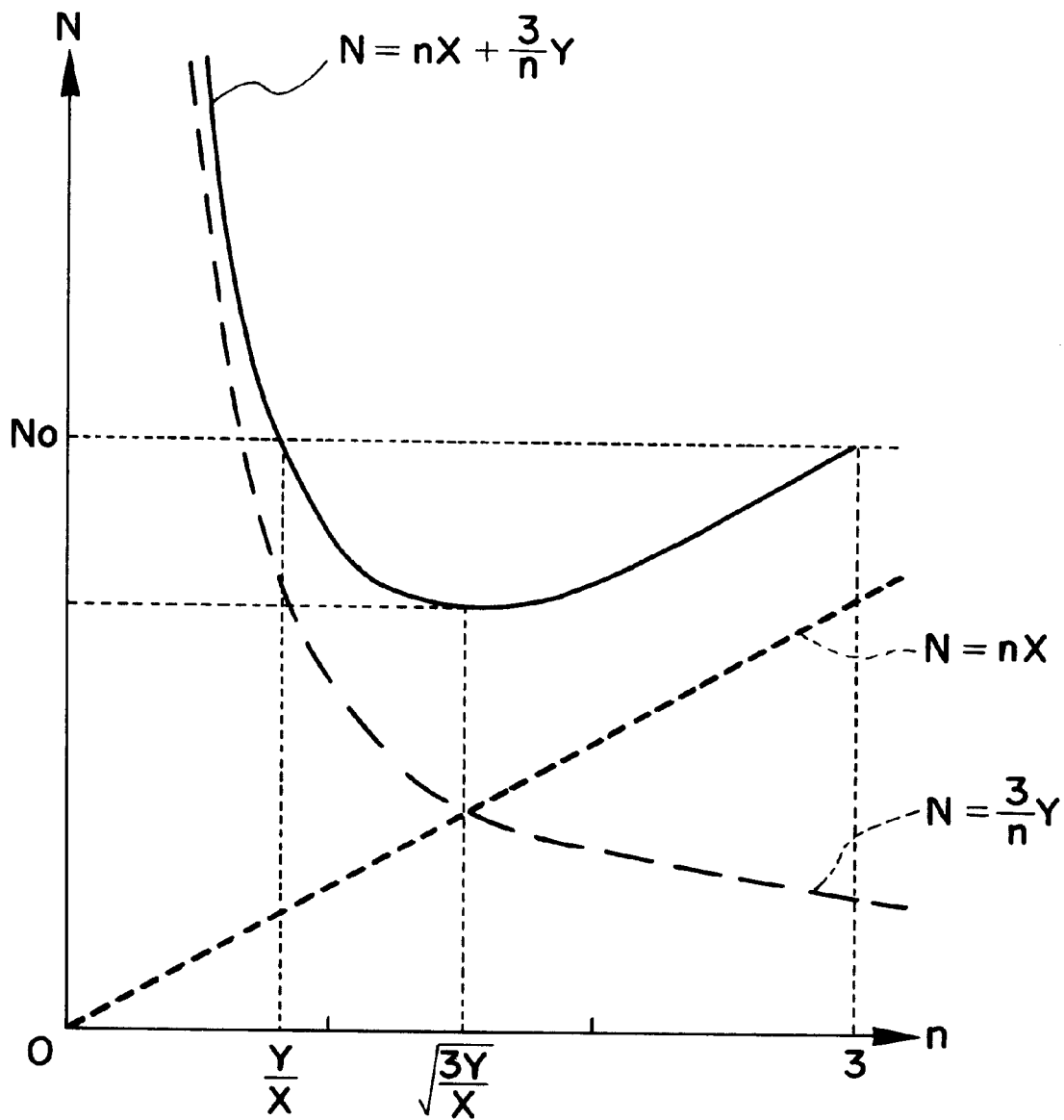
FIG. 10 is a graph showing a relationship between a total number N of scanning electrodes and data electrodes and a number n that is a quotient of a total number of data electrodes by a number of pixels arranged along a direction of extension of a scanning electrode.
Figure 11:
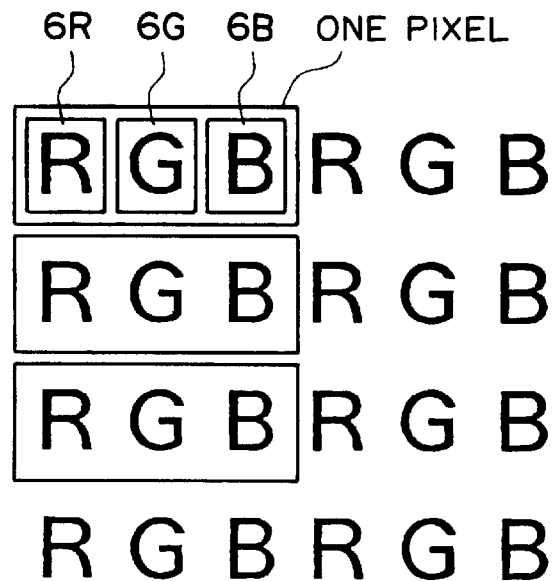
FIGS. 11–13 are respectively a schematic plan view showing an example of conventional sub-pixel arrangement.

FIG. 10 is a graph showing a relationship between N (total number of scanning electrodes $9a$ and data electrodes $9b$) and n (value obtained by dividing the total number of data electrodes $9b$ with a number of pixels disposed along a scanning electrode $9a$, represented by a formula of N=nX+(3/n)Y corresponding to a solid curve in FIG. 10.

In a conventional liquid crystal panel, n is 3 so that the total number ($N_0$) of electrodes is given by $N_0=3X+Y$.

Now, another value of n giving the total electrode number $N_0$ may be obtained from a relationship of:

$$N_0=3X+Y=nX+(3/n)Y.$$

This gives n=Y/X.

Accordingly, from the solid curve shown in FIG. 10, the number n satisfing Y/X<n<3 gives a total number of electrodes N smaller than $N_0$.

Further, if n is set to satisfy n=ca. $(3Y/X)^{1/2}$, the total number of electrodes, i.e., driver IC channels, can be minimized. This relationship is derived as follows.

The total number N of scanning electrodes and data electrodes is given by the following formula:

$$N=nX+(3/n)Y.$$

The number n giving a minimum of N may be determined by a differential of the above formula with n, i.e., $$(dN/dn)=X-(3/n^2)Y=0.$$

Thus, (dN/dn)=0 is given by the number n satisfying n=ca. $(3Y/X)^{1/2}$.

From this equation, a number n giving a minimum of total number of electrodes in the case of X=1280 and Y=1024 may be determined as $$n = ca.\ 3 \times 1024/1280 = ca.\ 1.55.$$

Next, a manner of determining sub-pixel arrangement giving a minimum total number N of electrodes (i.e., n=ca. 1.55), will be described.

In the case of n=ca. 1.55, a number m obtained by dividing the total number of scanning electrodes $9a$ by a number of pixels disposed along a data electrode $9b$ is given by:

$$m = 3/n = ca.\ 3/1.55 = ca.\ 1.94.$$

Now, in case of forming a×a pixels with a number n' of data electrodes $9b$ and a number of m' of scanning electrodes $9a$ (a, n' and m' are all natural numbers), the number of sub-pixels are given by $3 \times a \times a = n' \times m'$.

The above-mentioned numbers n and m (not limited to natural numbers) correspond to n' and m' for a=1, and therefore:

$$3 \times 1 \times 1 = n \times m.$$

Accordingly, the following relationship is given:

$$n':m' = n:m = ca\ 1.55:1.94.$$

As natural numbers n' and m' satisfying this relationship, the following values may be determined:

$$n' = ca.\ 3\ \text{and}\ m' = ca.\ 4.$$

Also from these values, a number of a=2 may be given, so that the total number of electrodes N may be given in case where 4 pixels of vertically 2×laterally 2 are composed of 4 scanning electrodes $9a$ and 3 data electrodes $9b$.

Figure 12:
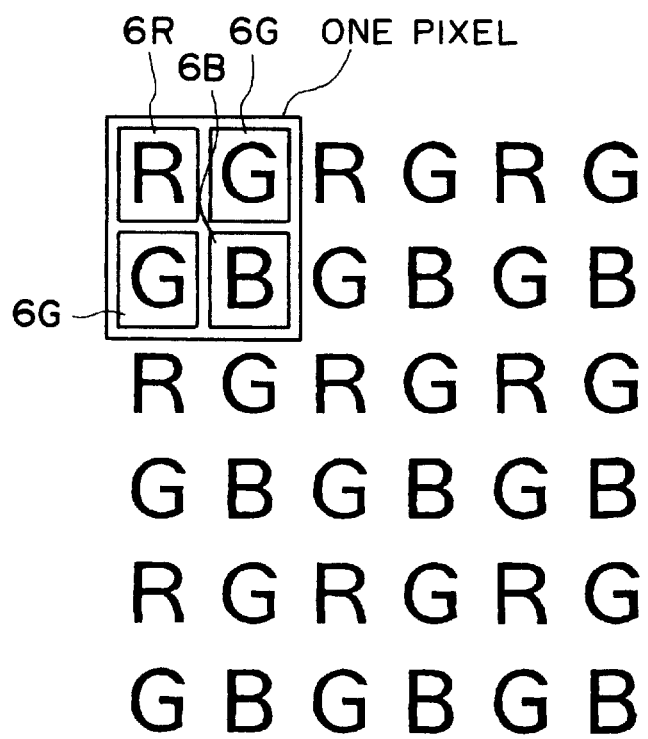
Figure 13:
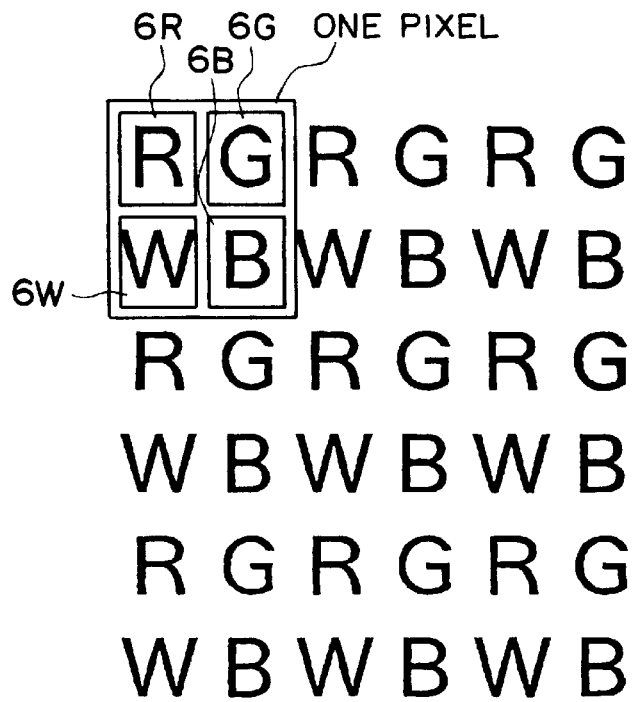

On the other hand, if a color filter 6 is composed of color filter segments of three primary colors R, G and B, a color display apparatus of a better color purity can be obtained than in the case where a color filter segment in addition to such color filter segments of three primary colors is included (as in the case of FIGS. 12 and 13).

Further, if the sub-pixels R, G and B are formed in substantial equal areas and disposed at substantially equal spacings, the vertical and lateral display densities become almost equal, thus giving a good picture quality.

EXAMPLES

Example 1

In this Example, one pixel requires 2 data electrodes $9b$ (n=2) so as to satisfy 1<n<3, while 3/2 scanning electrodes $9a$ are required for one pixel.

More specifically, as shown in FIG. 5A, for adjacent 3 scanning electrodes (a first scanning electrode $9a_n$, a second scanning electrode $9a_{n+1}$ and a third scanning electrode $9a_{n+2}$), first-color and second-color color filter segments 6R and 6G are alternately disposed along the first scanning electrode $9a_n$; third-color and first-color color filter segments 6B and 6R are alternately disposed along the second scanning electrode $9a_{n+1}$; and second-color and third-color color filter segments 6G and 6B are alternately disposed along the third scanning electrode $9a_{n+2}$; so that as shown in FIG. 5B, one pixel is first-color and second-color color filter segments 6R and 6G along the first scanning electrode the first scanning electrode $9a_n$, and a third-color color filter segment 6B along the second scanning electrode $9a_{n+1}$, and another one pixel is composed of a first-color color filter segment 6R along the second scanning electrode $9a_{n+1}$, and second color and third-color color filter segments 6G and 6B along the third scanning electrode $9a_{n+2}$. Consequently, 4 pixels are formed by 4 data electrodes $9b$ and 3 scanning electrodes $9a$ in this Example.

On the other hand, a liquid crystal panel has a diagonal size of 15 inches with a vertical/lateral ratio of 4/3 (a vertical size of 12 inches and a lateral size of 9 inches) and has a display density of 300 dpi. Accordingly, the number (X) of pixels arranged along a scanning electrode $9a$ is X=12×300=3600, and the number (Y) of pixel along a data electrode $9b$ is Y=9×300=2700, thus satisfying a relationship of Y/X<n<3.

In this Example, as described in detail above regarding the embodiments, the pixel pitch can be reduced than a conventional value, thus allowing an increased upper limit of display density (e.g., up to ca. 210 dpi in case of using driver ICs of TCP-type). Incidentally, the display density can be further increased up to 420 dpi if both side loading is adopted.

Further, as the total number (N) of driver IC channels can be reduced, the product and production costs can be reduced correspondingly. More specifically, $$N = 3600 \times 2 + 2700 \times 3/2$$
$$= 7200 + 4050 = 11250.$$

This is substantially smaller than a conventional value of 13500.

Example 2

In this Example, one pixel requires 3/2 data electrodes $9b$ (n=3/2), satisfying 1<n<3, and also 2 scanning electrodes $9a$.

More specifically, as shown in FIG. 6A, first-color to third-color color filter segments 6R, 6G and 6B are disposed in this order along the first scanning electrode $9a_n$ on the second scanning electrode $9b_{n+1}$, respectively, but with one color filter segment shifted along the second scanning electrode $9a_{n+1}$, so that the third color filter segment 6B along the second scanning electrode $9a_{n+1}$ is disposed adjacent to the first color filter segment 6R along the first scanning electrode $9a_n$; whereby as shown in FIG. 6B, one pixel is composed of first color and second-color color filter segments 6R and 6G along the first scanning electrode $9a_n$ and a third-color color filter segment 6B along the second scanning electrode $9a_{n+1}$, and another one pixel is composed of a third-color color filter segment 6B along the first scanning electrode $9a_n$ and first-color and second-color color filter segments 6R and 6G along the second scanning electrode $9a_{n+1}$. Consequently, 4 pixels are formed by 3 data electrodes $9b$ and 4 scanning electrodes $9a$ in this Example.

On the other hand, a liquid crystal panel is designed to have a diagonal size of 15 inches with a vertical/lateral ratio of 4/3 (a vertical size of 12 inches and a lateral size of 9 inches) are has a display density of 300 dpi. Accordingly, the number (X) of pixels arranged along a scanning electrode $9a$ is X=12×300=3600, and the number (Y) of pixel along a data electrode $9b$ is Y=9×300=2700, thus satisfying a relationship of Y/X<n<3.

In this Example, as described in detail above regarding the embodiments, the pixel pitch can be reduced than a conventional value, thus allowing an increased upper limit of display density (e.g., up to ca. 210 dpi in case of using driver ICs of TCP-type). Incidentally, the display density can be further increased up to 420 dpi if both side loading is adopted.

Further, as the total number (N) of driver IC channels can be reduced, the product and production costs can be reduced correspondingly. More specifically, $$N = 3600 \times 3/2 + 2700 \times 2$$
$$= 5400 + 5400 = 10800.$$

This is substantially smaller than a conventional value of 13500.

Thus, in this Example, as n is set at 1.5 which is close to $(3Y/X)=(3\times2700/3600)^{1/2}=1.5$, the total number of electrodes and therefore also the total number of driver IC channels can be minimized.

Example 3

In this Example, one pixel requires 2 data electrodes 9b (n=3/2), satisfying 1<n<3, and also 2 scanning electrodes 9a.

More specifically, as shown in FIG. 7A, first-color and second-color color filter segments 6R and 6G are disposed alternately along a first scanning electrode $9a_n$, and third-color color filter segments and disposed in succession along a second scanning electrode $9a_{n+1}$, while the third-color color filter segments 6B are designed to have an area which is a half that of each of the first-color and second-color color filter segments 6R and 6G. Further, one pixel is composed of first-color and second-color color filter segments 6R and 6G and two third-color color filter segments 6B. Consequently, 4 pixels are formed by 4 data electrodes 9b and 4 scanning electrodes 9a in this Example.

On the other hand, a liquid crystal panel is designed to have a diagonal size of 15 inches with a vertical/lateral ratio of 4/3 (a vertical size of 12 inches and a lateral size of 9 inches) are has a display density of 300 dpi. Accordingly, the number (X) of pixels arranged along a scanning electrode 9a is X=12×300=3600, and the number (Y) of pixel along a data electrode 9b is Y=9×300=2700, thus satisfying a relationship of Y/X<n<3.

In this Example, as described in detail above regarding the embodiments, the pixel pitch can be reduced than a conventional value, thus allowing an increased upper limit of display density (e.g., up to ca. 210 dpi in case of using driver ICs of TCP-type). Incidentally, the display density can be further increased up to 420 dpi if both side loading is adopted.

Further, as the total number (N) of driver IC channels can be reduced, the product and production costs can be reduced correspondingly. More specifically, $$N = 3600 \times 2 + 2700 \times 2$$
$$= 7200 + 5400 = 12600.$$

This is substantially smaller than a conventional value of 13500.

Further, in this Example, each pixel is formed in a shape close to a square, so that it is possible to obtain a liquid crystal panel rich in color reproducibility.

Example 4

Figure 19:
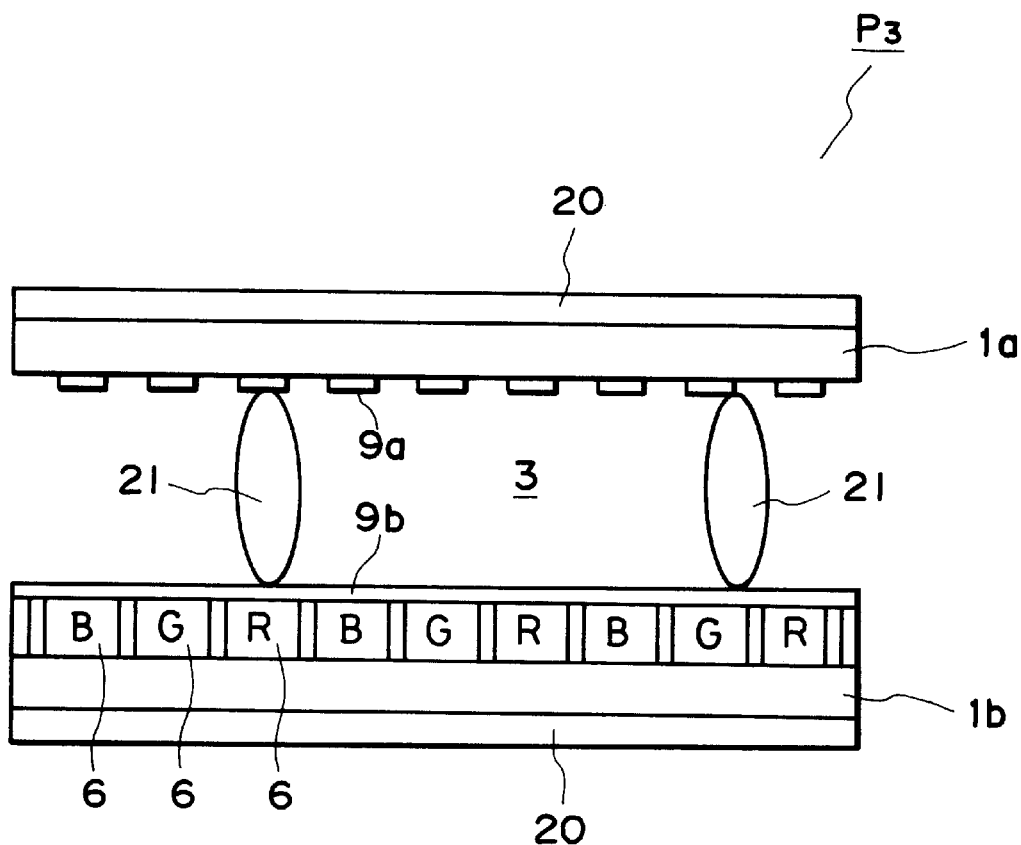
FIG. 19 is a schematic sectional view of an embodiment of the color display apparatus according to the invention.

In this Example, a liquid crystal panel P3 having a sectional structure as shown in FIG. 19 is used to constitute a color display apparatus. More specifically, the liquid crystal panel P3 comprises a glass substrate 1a provided with transparent scanning electrodes 9a, a glass substrate 1b provided with transparent data electrodes 9b, a pair of alignment films (not shown) coating the electrodes 9a and 9b, respectively, and a liquid crystal 3 sandwiched between the substrates 1a and 1b disposed with a prescribed gap therebetween held by spacers 21. Further, the resultant cell structure is sandwiched between a pair of polarizers 20.

The liquid crystal panel is provided with a sub-pixel arrangement as shown in FIG. 14 and described hereinbelow.

In this Example, sub-pixels are disposed in three columns as a unit, wherein
  sub-pixels of G (1st color) and B (2nd color) are disposed alternately in a first column,
  sub-pixels of R (3rd color) are disposed in succession in a second column, and
  sub-pixels of G (1st color) and B (2nd color) are disposed alternately in a third column, so that
  one pixel is composed of sub-pixels of G and B in the first column, and a sub-pixel of R in the second column, and
  another one pixel is composed of a sub-pixel of R in the second column, and sub-pixels of G and B in the third column. Further, the sub-pixel arrangement is repeated with such three columns as a unit.

As a result of the above-described arrangement, the above-defined value n becomes 2 satisfying 1<n<k=3. Further, in this Example, the sub-pixels R, G and B are designed to have substantially equal areas and be arranged in substantially equal spacings.

In this Example, as the sub-pixels are composed of three primary colors of R, G and B, it is possible to obtain a liquid crystal panel of better color purity than in the case of including a sub-pixel of another color (as in FIG. 13).

Further, as the sub-pixels of R, G and B have substantially equal areas and are arranged with substantially equal spacings, the display density in a vertical direction is substantially equal to that in a lateral direction, thus providing a good picture quality.

Further, in this Example, the pixel pitch can be decreased compared with the conventional value, and the total number of driver IC channels can be reduced, thus allowing a reduction in product cost and production cost.

This Example is also effective in reducing luminance irregularity as will be described below with reference to FIGS. 20A to 20C.

In a display panel having a resolution on the order of 280 dpi, a difference in luminance between columns is not recognizable by human eyes, even if such a difference in luminance (i.e., a value obtained by dividing a total of luminance at sub-pixels in a column with the number of the sub-pixels in the column) is present between columns and a repetition of bright and dark is present, unless rows or columns of almost equal luminance are present in succession (e.g., a succession of columns or rows of bright sub-pixels or dark sub-pixels). On the other hand, in case where rows or columns of sub-pixels of substantially equal luminances are present in succession along with another row or column of sub-pixels showing a substantially different luminance, the luminance difference can be recognized as a color irregularity (or color line) by human eyes, thus resulting in an inferior picture quality.

FIGS. 20A and 20B respectively show a relationship of luminances for the respective columns and disposition of sub-pixels R, G and B in case where all the sub-pixels are turned on, under the condition that the sub-pixels of R, G and B show relative luminances (i.e., relative transmittances through respective color filter segments) of 20:50:10. In the illustrated arrangement, respective rows show a repetition of brightness and darkness (a repetition of luminance levels of 37 and 17 for FIG. 20A and a repetition of 23 and 30 for FIG. 20B) row by row and without a succession of rows of equal brightness, so that the difference in luminance level between rows is not recognizable. However, vertically arranged columns include a succession of columns of equal luminance (two columns of luminance of 35 in FIG. 20A and two columns of luminance of 15 in FIG. 20B), and provides a large difference in luminance from that in an adjacent column (i.e., 35−10=15 in FIG. 20A and 50−15=35 in FIG. 20B), the luminance difference can be recognized as a color irregularity (color line), thus resulting in inferior picture quality.

In contrast thereto, in the case of this Example illustrated in FIG. 20C, the respective rows show a repetition of relative luminances of 40 and 13 which however do not appear in succession, so that the luminance difference is free from recognition with human eyes. Further, the respective rows include a succession of two columns of luminance at 30, but a difference in luminance from an adjacent row is as small as 30−20=10, so that the luminance difference is free from recognition with human eyes.

A further effect of this Example regarding picture quality will be described with reference to FIGS. 21 to 23.

Figures 21A, 21B, 21C:
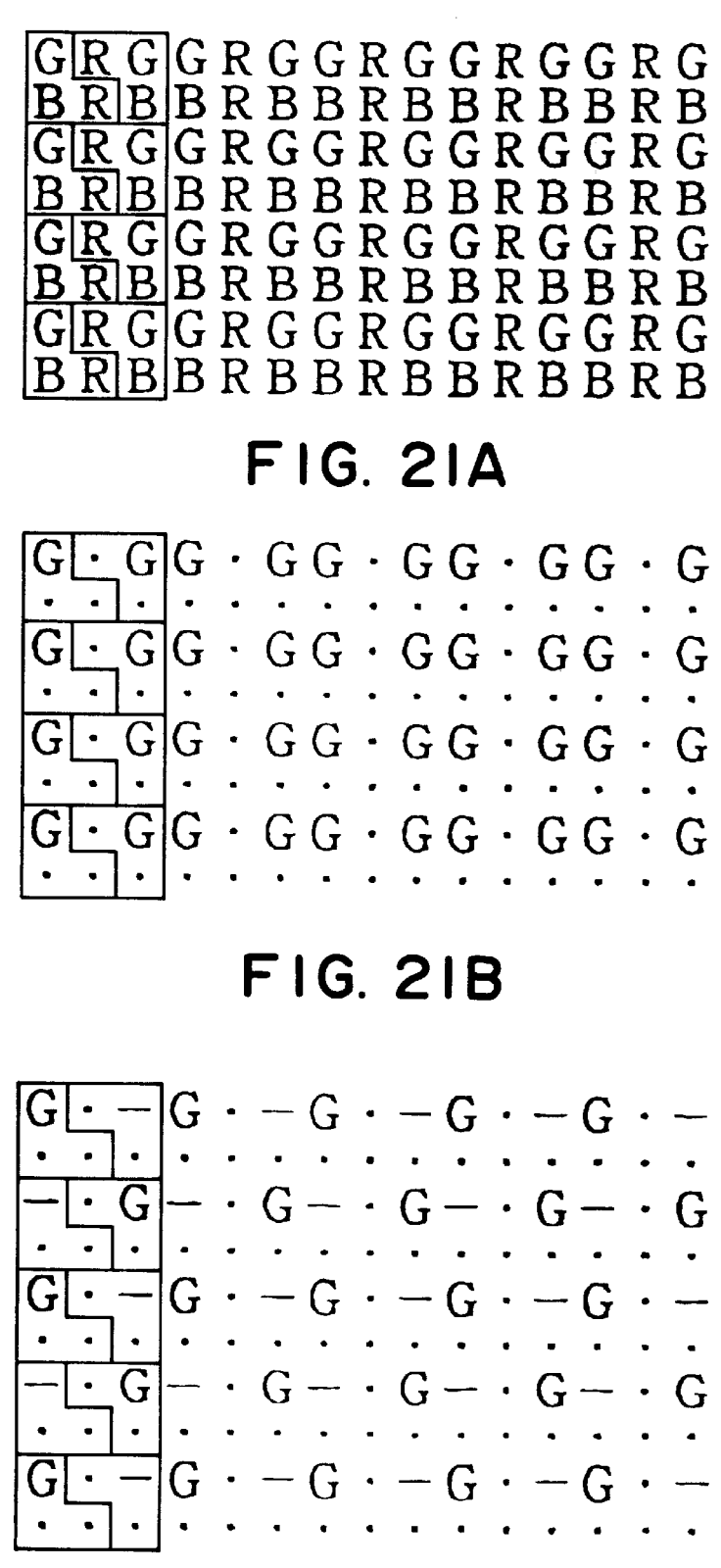

In case of ordinary picture display, all pixels may be turned on in some opportunity or frequently. FIG. 21A illustrates a state of "white display" by turning on all the sub-pixels of all the pixels, and FIG. 21B shows a state of "green display" by turning on only the green sub-pixels of all the pixels.

On the other hand, in the case of a halftone display, a reduced number of pixels may be turned on. FIG. 20C illustrates a green display state wherein turned-on pixels and turned-off pixels are alternately disposed, like a checker pattern.

In this Example, in any of the display patterns shown in FIGS. 21A–21C, it is possible to obviate the occurrence of luminance irregularity (fringe irregularity or linear irregularity), thus maintaining a good picture quality. This effect can be attained also in the case of a halftone display according to the dither scheme.

Figures 22A, 22B, 22C:
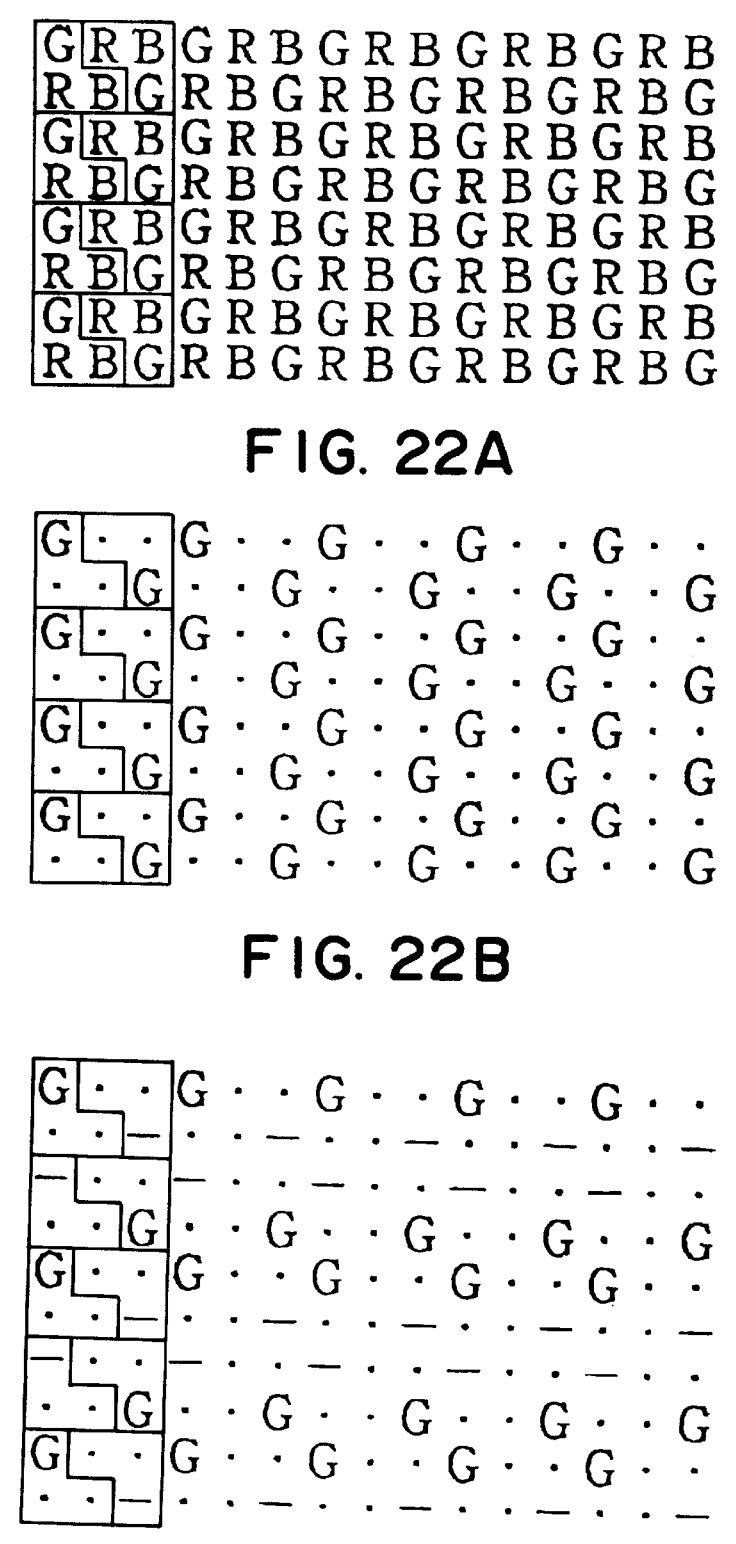

In contrast thereto, in the case of a sub-pixel pattern shown in FIG. 22A, if turned-on pixels and turned-off pixels are disposed alternately in a checker pattern as shown in FIG. 22C, brighter rows and darker row are disposed every two other rows, so that the brighter two rows can be recognized as lateral fringes, thus resulting in an inferior picture quality. Incidentally, FIG. 20B shows a full green display state by turning on only the green sub-pixels of all the pixels.

Figures 23A, 23B:
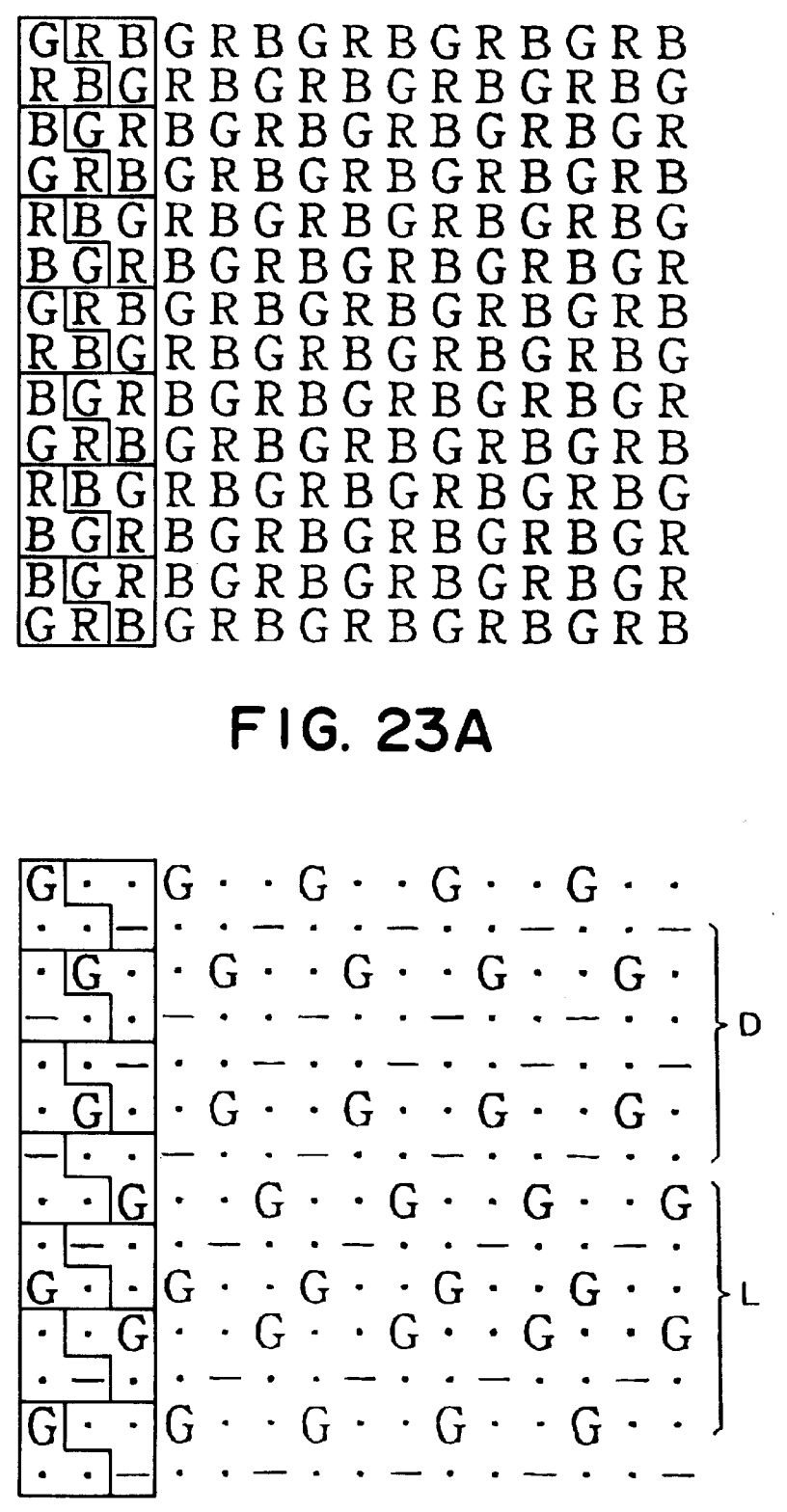

On the other hand, in the case of a sub-pixel pattern shown in FIG. 23A, if turned-on pixels and turned-off pixels are disposed alternately like a checker pattern, as shown in FIG. 23B, a sparsely lighted region D wherein only 2 rows among 6 rows are turned on, and a densely lighted region L wherein 4 rows among 6 rows are turned on, are present alternately, so that the region L is recognized as a brighter lateral fringe, thus resulting in an inferior picture quality.

Example 5

A sub-pixel pattern including threee columns as a unit as shown in FIG. 15 is adopted, wherein
sub-pixels of G (1st color) and R (2nd color) are disposed alternately in a first column,
sub-pixels of B (3rd color) are disposed in succession in a second column, and
sub-pixels of G (1st color) and R (second color) are disposed alternately in a third column, so that
one pixel is composed of sub-pixels of G and R in the first column, and a sub-pixel of B in the second column, and
another one pixel is composed of a sub-pixel of B in the second column, and sub-pixels of G and R in the third column.

Other structures are similar to those in Example 4, and similar effects as in Example 4 may be attained.

Example 6

A sub-pixel pattern including these columns as a unit as shown in FIG. 16 is adopted, wherein
sub-pixels of B (1st color) and R (2nd color) are disposed alternately in a first column,
sub-pixels of G (3rd color) are disposed in succession in a second column, and
sub-pixels of B (1st color) and R (second color) are disposed alternately in a third column, so that
one pixel is composed of sub-pixels of B and R in the first column, and a sub-pixel of G in the second column, and
another one pixel is composed of a sub-pixel of G in the second column, and sub-pixels of B and R in the third column.

Other structures are similar to those in Example 4, and similar effects as in Example 4 may be attained.

Example 7

A sub-pixel pattern including these columns as a unit as shown in FIG. 15 is adopted, wherein
sub-pixels of G (1st color) and R (2nd color) are disposed alternately in a first column,
sub-pixels of R (2nd color) and B (3rd color) are disposed alternately in a second column, and
sub-pixels of B (3rd color) and G (1st color) are disposed alternately in a third column, so that
one pixel is composed of sub-pixels of G and R in the first column, and a sub-pixel of B in the second column, and
another one pixel is composed of a sub-pixel of R in the second column, and sub-pixels of B and G in the third column.

Other structures are similar to those in Example 4, and similar effects as in Example 4 may be attained.

Example 8

A sub-pixel pattern including these columns as a unit as shown in FIG. 18 is adopted, wherein
sub-pixels of G (1st color), R (2nd color) and B (3rd color) are arranged in this order in a first column,
sub-pixels of G, R and B are arranged in this order in a second column so that the sub-pixels of G (1st color) therein are disposed adjacent to the sub-pixels of B (3rd color) in the first column, and
sub-pixels of G. R and B are arranged in this order in a third column so that the sub-pixels of G (1st color) therein are disposed adjacent to the sub-pixels of B (3rd color) in the second column, whereby
one pixel is composed of (2i−1)th and (2i)th sub-pixels in the first column, and a (2i)th sub-pixel in the second column, and
another one pixel is composed of a (2i−1)th sub-pixel in the second column, and (2i−1)th and (2i)th sub-pixels in the third column, for each i (i=natural number).

Other structures are similar to those in Example 4, and similar effects as in Example 4 may be attained.

As described above, according to the present invention, there is provided a color display apparatus including a multiplicity of sub-pixels each designed for displaying one of a plurality (k) of mutually different mono-colors and arranged in rows and columns so as to form pixels each with a plurality of mutually adjacent sub-pixels, wherein the sub-pixels and pixels are so arranged that a number n given by dividing a total number of sub-pixels arranged in a row or column with a total number of pixels arranged in the row or column is set to satisfy: 1<n<k, wherein k denotes the plurality of the mono-colors displayed by the sub-pixels.

As a result, the minimum pixel pitch can be decreased compared with the conventional value, thus being able to increase the upper limit of the display density.

Incidentally, if the number of electrodes (scanning electrodes or gate electrodes) is increased in order to minimize the difference between the pixel pitch along a scanning electrode 9a and the pixel pitch along a data electrode 9b as described above, the picture quality is liable to be inferior in the case of an STN-type liquid crystal device, or it is necessary to lower the resistivity of a gate electrode in the case of a TFT-type liquid crystal device, but a liquid crystal device using a ferroelectric liquid crystal having bistability is free from such difficulties.

On the other hand, in case where the number n is set to satisfy (Y/X)<n<3, the total number of scanning electrodes and data electrodes can be reduced than the conventional value, and the total number of driver IC channels can be reduced correspondingly, thus reducing the product cost and the production cost.

Further, if n is set to satisfy n=ca. $(3Y/X)^{1/2}$, the total number of electrodes, i.e., driver IC channels, can be minimized.

Further, if the sub-pixels are composed of three primary colors of R, G and B, it is possible to obtain a liquid crystal panel of better color purity than in the case of including a sub-pixel of another color (as in FIG. 13).

Further, if the sub-pixels of R, G and B have substantially equal areas and are arranged with substantially equal spacings, the display density in a vertical direction is substantially equal to that in a lateral direction, thus providing a good picture quality.

What is claimed is:

1. A color display apparatus, comprising:
   a multiplicity of sub-pixels each designed for displaying one of 3 mutually different mono-colors and arranged in β rows and α columns so as to form pixels each with 3 mutually adjacent sub-pixels,
   the pixels being arranged in Y rows and X columns wherein β, α, Y and X are independently integers greater than 1; and
   a number n given by dividing a total number of sub-pixels in one of β rows with a total number of pixels in one of Y rows is substantially equal to $(3Y/X)^{1/2}$ while satisfying the relationships: 1<n< and Y/X<n
   the pixels and sub-pixels are arranged so as to include a unit of four pixels formed by three rows and four columns of sub-pixels wherein each pixel has two sub-pixels in a given row and a third pixel in an adjacent row.

2. A color display apparatus according to claim 1, comprising a pair of oppositely disposed substrates, a liquid crystal disposed between the substrates, a plurality (β) of scanning electrodes, and a plurality (α) of data electrodes intersecting the scanning electrodes so as to have one color filter segment for constituting the sub-pixel at each intersection of the scanning electrodes and the data electrodes, wherein the number n is given by dividing a total number (α) of the data electrodes with a number (X) of pixels arranged in a direction along a scanning line.

3. A color display apparatus according to claim 2, wherein the scanning electrodes are formed on one of the pair of substrates, and the data electrodes are formed on the other substrate.

4. A color display apparatus according to claim 2, wherein the sub-pixels and pixels are disposed along three scanning electrodes as a unit including first to third scanning electrodes, such that
   sub-pixels of first and second colors are alternately disposed along the first scanning electrode,
   sub-pixels of third and first colors are alternately disposed along the second scanning electrode, and
   sub-pixels of second and third colors are alternately disposed along the third scanning electrode, whereby
   one pixel is composed of sub-pixels of the first and second colors along the first scanning electrode and a sub-pixel of the third color along the second scanning electrode, and
   another one pixel is composed of a sub-pixel of the first color along the second scanning electrode and sub-pixels of the second and third colors along the third scanning electrode.

5. A color display apparatus according to claim 2, wherein the sub-pixels and pixels are disposed along two scanning electrodes as a unit including first and second scanning electrodes, such that
   sub-pixels of first to third colors are disposed in this order along the first scanning electrode, and
   sub-pixels of the first to third colors are disposed in this order along the second scanning electrode so that the sub-pixels of the third color along the second scanning electrode are disposed adjacent to the sub-pixels of the first or second color along the first scanning electrode, whereby
   one pixel is composed of sub-pixels of the first and second colors along the first scanning electrode, and a sub-pixel of the third color along the second scanning electrode, and
   another one pixel is composed of a sub-pixel of the third color along the first scanning electrode and sub-pixels of the first and second colors along the second scanning electrode.

6. A color display apparatus according to claim 2, wherein the sub-pixels and pixels are disposed along three scanning electrodes as a unit including first to third scanning electrodes such that
   sub-pixels of first to third colors are disposed in this order both along a scanning electrode and along a data electrode, so that one pixel is formed by each one of following groups of sub-pixels,
   sub-pixels of the first and second colors along the first scanning electrode and a sub-pixel of the third color along the second scanning electrode,
   sub-pixels of the third and first color along the first scanning electrode and a sub-pixel of the second color along the second scanning electrode,
   sub-pixels of second and third colors along the first scanning electrode, and a sub-pixel of the first color along the second scanning electrode,
   a sub-pixel of the third color along the second scanning electrode and sub-pixels of the first and second colors along the third scanning electrode, a sub-pixel of the second color along the second scanning electrode and sub-pixels of the third and first colors along the third scanning electrode, and a sub-pixel of the first color a long the second scanning electrode and sub-pixels of the second and third colors along the third scanning electrode.

7. A color display apparatus according to claim 2, wherein the sub-pixels and pixels are disposed along three scanning electrodes as a unit including first to third scanning electrodes, such that sub-pixels of the first and second colors are alternately disposed along the first scanning electrode, sub-pixels of the second color are disposed in succession along the second scanning electrode, and sub-pixels of the first and second colors are alternately disposed along the third scanning electrode, so that one pixel is composed of sub-pixels of the first and second colors along the first scanning electrode, and a sub-pixel of the third color along the second scanning electrode, and another one pixel is composed of a sub-pixel of the third color along the second scanning electrode and sub-pixels of the first and second colors along the third scanning electrode.

8. A color display apparatus according to any one of claims 2 to 7, wherein the sub-pixels of the first to third colors are sub-pixels of three primary colors of R, G and B.

9. A color display apparatus according to any one of claims 1 and 2 to 7, wherein said liquid crystal is a liquid crystal showing ferroelectricity.

10. A color display apparatus according to claim 1, wherein the pixels are composed of sub-pixels arranged in three adjacent columns as a unit including first to third columns, sub-pixels of the first and second colors are alternately disposed in the first column, sub-pixels of the third color are disposed in succession in the second column, sub-pixels of the first and second colors are alternately disposed in the third column, so that one pixel is composed of sub-pixels of the first and second colors in the first column and a sub-pixel of the third color in the second column, and another one pixel is composed of a sub-pixel of the third color in the second column and sub-pixels of the first and second colors in the third column.

11. A color display apparatus according to claim 10, wherein said first, second and third colors are green, blue and red, respectively.

12. A color display apparatus according to claim 10, wherein said first, second and third colors are green, red and blue, respectively.

13. A color display apparatus according to claim 10, wherein said first, second and third colors are blue, red and green, respectively.

14. A color display apparatus according to claim 1, wherein the pixels are composed of sub-pixels arranged in three adjacent columns as a unit including first to third columns, sub-pixels of the first and second colors are alternately disposed in the first column, sub-pixels of the second and third colors are alternately disposed in the second column, sub-pixels of the third and first colors are alternately disposed in the third column, so that one pixel is composed of sub-pixels of the first and second colors in the first column and a sub-pixel of the third color in the second column, and another one pixel is composed of a sub-pixel the second color in the second column and sub-pixels of the third and first colors in the third column.

15. A color display apparatus according to claim 14, wherein said first, second and third colors are green, red and blue, respectively.

16. A color display apparatus according to claim 1, wherein the pixels are composed of sub-pixels arranged in three adjacent columns as a unit including first to third columns, sub-pixels of the first and second colors are disposed in this order in the first column, sub-pixels of the first to third colors are disposed in this order in the second column so that the sub-pixels of the first color therein are disposed adjacent to the sub-pixels of the third color in the first column, sub-pixels of the first to third colors are disposed in this order in the third column so that the sub-pixels of the first color therein are disposed adjacent to the sub-pixels of the third color in the second column, one pixel is composed of $(2i-1)$th and $(2i)$th sub-pixels in the first column and a $(2i)$th sub-pixel in the second column, and another one pixel is composed of a $(2i-1)$th sub-pixel in the second column and $(2i-1)$th and $(2i)$th sub-pixels in the third column, for each i (i=a natural number).

17. A color display apparatus according to claim 16, wherein said first, second and third colors are green, red and blue, respectively.

18. A color display apparatus according to any of claims 10 to 17, wherein the sub-pixels of the first to third colors are formed in substantially equal areas and disposed at substantially equal spacings.

19. A color display apparatus according to any of claims 10 to 17, wherein the sub-pixels of the first to third colors forming one pixel are arranged so that their centers form a triangle of which the largest side and the smallest side provide a ratio therebetween of at most 1.5.

* * * * *

UNITED STATES PATENT AND TRADEMARK OFFICE
CERTIFICATE OF CORRECTION

PATENT NO. : 6,326,981 B1
DATED : December 4, 2001
INVENTOR(S) : Hideo Mori et al.

It is certified that error appears in the above-identified patent and that said Letters Patent is hereby corrected as shown below:

Column 5,
Line 5, "a" (second occurrence) should be deleted.

Column 7,
Line 15, "nd" should read -- and --; and
Line 35, "segment" should read -- segments --.

Column 8,
Line 31, "$(3Y/X)^{1/12}$." should read -- $(3Y/X)^{1/2}$. --.

Column 9,
Line 38, "isoscales" should read -- isosceles --; and
Line 52, "e-the" should read -- the --.

Column 12,
Line 56, "are" should read -- and --; and
Line 62, "than" should read -- smaller than --.

Column 13,
Line 35, "are" should read -- and --; and
Line 41, "than" should read -- smaller than --.

Column 17,
Line 28, "than" should read -- smaller than --; and
Line 57, "1<n<" should read -- 1<n<3 --.

Column 19,
Line 4, "a long" should read -- along --; and
Line 30, "1 and 2 to 7," should read -- 1 to 7, --.

UNITED STATES PATENT AND TRADEMARK OFFICE
CERTIFICATE OF CORRECTION

PATENT NO.    : 6,326,981 B1
DATED         : December 4, 2001
INVENTOR(S)   : Hideo Mori et al.

It is certified that error appears in the above-identified patent and that said Letters Patent is hereby corrected as shown below:

<u>Column 20,</u>
Line 15, "sub-pixel" should read -- sub-pixel of --.

Signed and Sealed this

Thirtieth Day of July, 2002

Attest:

Attesting Officer

JAMES E. ROGAN
*Director of the United States Patent and Trademark Office*